United States Patent [19]

Tsunekawa et al.

[11] Patent Number: 4,647,174
[45] Date of Patent: Mar. 3, 1987

[54] FOCUS DETECTING AND/OR FOCUS ADJUSTMENT METHOD

[75] Inventors: Tokuichi Tsunekawa, Kanagawa; Kazuya Hosoe; Takao Kinoshita, both of Tokyo; Takashi Kawabata, Kanagawa; Shinji Sakai; Tatsuya Taguchi, both of Tokyo, all of Japan

[73] Assignee: Canon Kabushiki Kaisha, Tokyo, Japan

[21] Appl. No.: 769,795

[22] Filed: Aug. 26, 1985

Related U.S. Application Data

[63] Continuation of Ser. No. 452,508, Dec. 23, 1982, which is a continuation of Ser. No. 192,194, Sep. 30, 1980, abandoned.

[30] Foreign Application Priority Data

Oct. 1, 1979 [JP] Japan .................. 54-127206

[51] Int. Cl.$^4$ .................... G03B 3/00
[52] U.S. Cl. .................... 354/402; 354/407; 354/408; 364/525; 356/1
[58] Field of Search .......... 354/400, 402, 406, 407, 354/408, 409; 364/525; 356/1

[56] References Cited

U.S. PATENT DOCUMENTS

| | | | |
|---|---|---|---|
| 4,135,815 | 1/1979 | Masunaga et al. | 250/201 X |
| 4,185,191 | 1/1980 | Stauffer | 354/407 |
| 4,189,232 | 2/1980 | Asano et al. | 354/408 X |
| 4,250,376 | 2/1981 | Joseph et al. | 250/201 X |
| 4,265,520 | 5/1981 | Tokutomi et al. | 250/204 X |
| 4,283,137 | 8/1981 | Tsunekawa et al. | 250/204 X |
| 4,290,693 | 9/1981 | Stein | 250/204 X |
| 4,314,151 | 2/1982 | Suzuki et al. | 250/204 |
| 4,320,302 | 3/1982 | Stein | 250/201 X |
| 4,341,953 | 7/1982 | Sakai et al. | 250/204 |
| 4,346,970 | 8/1982 | Kawabata et al. | 354/407 |
| 4,387,975 | 6/1983 | Araki | 354/407 |
| 4,412,741 | 11/1983 | Stein | 250/201 X |

*Primary Examiner*—Russell E. Adams
*Attorney, Agent, or Firm*—Toren, McGeady, Stanger, Goldberg & Kiel

[57] ABSTRACT

Disclosed is a method of detecting the focusing condition of an image forming optical system to an object, in which two images of the object are formed with respective light beams from the prescribed exit pupil areas lying in almost symmetry to each other with respect to the optical axis of the optical system and are sensed to obtain an equal number of picture element data for each of the images, and based on the thus-obtained picture element data, while sequential shifting for the first image is carried out from its one end to its opposite end, and a sequential shifting for the second image from its symmetric one end thereto to its opposite end, each by a predetermined number of picture elements, a correlation betweeen the first and second images in every predetermined equal number of picture elements is sought, whereby an optimum correlation is obtained, the corresponding mutual positional relationship between the above-described predetermined numbers of picture elements is detected to discriminate whether or not the above-described image forming optical system is in focus for the above-described object.

52 Claims, 13 Drawing Figures

(a) PICTURE COMPARTMENTS IN VIEW-FIELD (b) WITH OBJECT AT PLANE P1 (IN-FOCUS CONDITION)

(c) WITH OBJECT AT PLANE P2 (FAR FOCUS CONDITION)

(d) WITH OBJECT AT PLANE P3 (NEAR FOCUS CONDITION)

(a) OBJECT PATTERN IN VIEW-FIELD (b) IN-FOCUS CONDITION (c) FAR FOCUS CONDITION (d) NEAR FOCUS CONDITION

F I G.10A
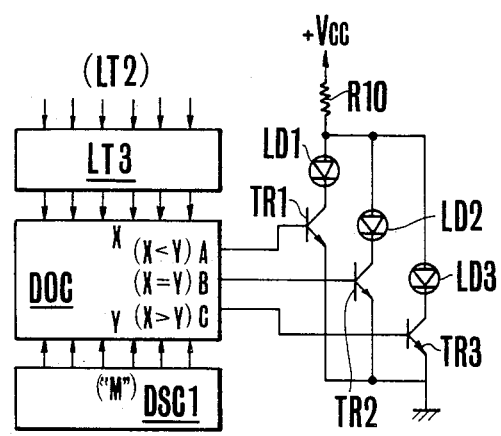
F I G.10B
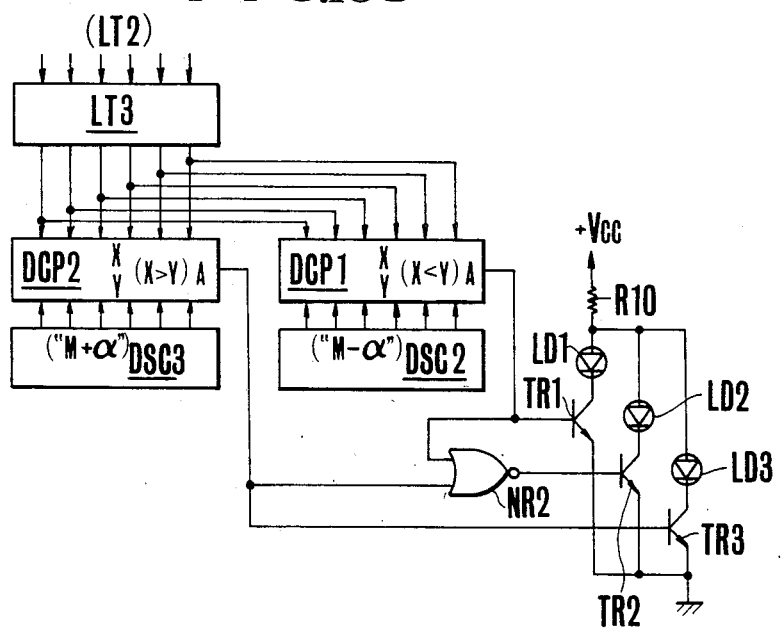

FOCUS DETECTING AND/OR FOCUS ADJUSTMENT METHOD

This is a continuation of application Ser. No. 452,508, filed Dec. 23, 1982, which in turn is a continuation of application Ser. No. 192,194, filed Sept. 30, 1980, now abandoned.

BACKGROUND OF THE INVENTION

1. Field of the Invention

This invention relates to a method of an apparatus for detecting whether or not an image forming optical system is focused on an object, and more particularly to a focus detecting method and apparatus of the so-called TTL (Through The Lens) type in which the focusing condition of the optical system is detected by sensing the imaging condition of an image of the object formed by the optical system.

2. Description of the Prior Art

For the above-described or so-called TTL type focus detecting method and apparatus, there have already been put forward a variety of proposals. Of these, the most typical one is that the non-linear output versus illumination response characteristic of a CdS element is utilized in sensing a change in the sharpness of an image of an object formed by an image forming optical system on the prescribed focal plane, to detect the focusing condition of the optical system to that object. Particularly, regarding this apparatus, various improvements have been achieved. However, this method of detecting the condition of sharpest focus of the image forming optical system, by measuring the sharpness of image as a function of the non-linear response characteristics of CdS elements, not only suffers from the difficulty of achieving a much desired increase of the sensitivity of the element, but also has the drawback that the condition when the image is in highest sharpness, or when the output of the element reaches a peak value, is difficult to detect with high precision. Thus, it is unavoidable that these factors lead to place a relative low limit on its detecting performance.

As a method of detecting the focusing condition of the optical system, on the other hand, besides the positive and direct measurement of the sharpness of the image, it is also possible to otherwise detect the focusing condition. As is disclosed, for example, in Japanese Laid-Open Patent Specifications Sho 51-15432 and Sho 52-138924, on the exit pupil plane of the image forming optical system there are prescribed two areas lying in almost symmetry to each other with respect to the optical axis of the optical system. Two light beams from these two prescribed exit pupil areas form two images on the prescribed focal plane at respective positions. By sensing the change in the distance between the positions, or, in extreme cases, the coincidence or non-coincidence of the two images, whether or not the image forming optical system is in focus for the object can be detected. And, since, in this case, the condition of sharp focus is determined as a function of not the image sharpness, but the difference in position between the two images, a particular advantage that focus detection can be performed with relative ease, while still permitting accuracy to be greatly increased, is fully expected therefrom. Another advantage of this method is that not only can the condition of sharpest focus be detected, but also, when the lens system is not in focus, the detection of a direction in which the optical system is in being moved, that is, either near focus or far focus can be indicated along with a determination of the amount of movement by which the optical system is brought into sharp focus. Therefore, the use of this idea in the TTL type focus detecting method gives rise to a high possibility of achieving remarkable improvements, with respect to various aspects, over the former idea of direct measurement of the image sharpness itself.

However, even when this latter idea is put into practice in the field of art of cameras and other optical instruments, while nevertheless permitting focus detection to be performed with fully satisfactory accuracy and with high reliability, there are necessary requirements for much more improvement.

According to the proposal, for example, in the above-cited Japanese Laid-Open Patent Specification Sho 51-15432, the above-described two images are sensed by respective groups of large numbers of photosensitive elements. By comparing the electrical outputs from the two photosensitive element groups with each other, the detection of a mutual positional relationship of the two images can be effected. And, for this purpose, it is suggested that the comparator circuit may be constructed in the form of, for example, a diode bridge circuit so that as all the photosensitive elements are paired up in positional correspondence between the two groups, the total sum of coincidence and incoincidences (or balances and unbalances) of the outputs of the photosensitive elements in every pair can be determined. However, it has been proven that such a simple comparison method and structure of the comparator circuit do not suffice to achieve what may be called an accurate focus detection, without encountering very difficult problems.

Further, according to another proposal as in Japanese Laid-Open Patent Specification Sho 52-138924, the above-described two images are received by respective photo-cells of the type in which their resistance values vary with the change in the positions of the images on the image-receiving surfaces there of (or, image position sensors). Then, the balance and unbalance of the resistance values of these two cells is detected through a bridge circuit to determine the mutual position as relationship of the two images. Even with such an improved comparison method and circuit structure, a much desired increase in the accuracy of focus detection is still very difficult to achieve.

SUMMARY OF THE INVENTION

With the foregoing in mind, the present invention has for its general object to eliminate all the conventional drawbacks, and to provide a novel method of and apparatus for focus detection and/or focus adjustment, with an advantage rendering it possible to achieve a higher degree of precision in determining the condition of sharpest focus, and a high accuracy of focus adjustment, than was heretofore possible.

An object of the present invention is to provide a novel and more excellent focus detecting method which makes it possible to determine the position of sharpest focus with a higher degree of precision than was heretofore possible, by the employment of the TTL type focus detecting technique in which, on the exit pupil plane of an image forming optical system, two areas are prescribed at locations almost symmetrical to each other with respect to an optical axis of the optical system, and two light beams from these two prescribed exit pupil areas form two images of the same object. Accordingly, a change in the difference between the positions of these two images is sensed to determine whether or not the image forming optical system is in focus for that object. This relative image position change sensing operation is performed particularly in such a mode that the two images are scanned for each cycle based on a minute picture area, and a certain correlation between the corresponding scanning results is sought.

Under such object, according to an embodiment of the present invention, a novel and more advantageous focus detecting method is proposed, in which two images of the object is formed with respective light beams from the prescribed exit pupil areas lying almost symmetrical to each other with respect to the optical axis of the optical system, and wherein sections of the formed images are scanned to obtain, for each formed image, equal amounts of picture element data for the scanned images sections. Based on the thus-obtained picture element data, while a sequential shifting for the first image is carried out from its one end to its opposite end, and a sequential shifting for the second image from its symmetric one end to its opposite end is also carried out, each by a predetermined number of picture elements, a correlation between the first and second images in every predetermined equal number of picture elements is sought. When an optimum correlation is obtained, the corresponding mutual positional relationship between the above-described predetermined numbers of picture elements is detected to discriminate whether or not the image forming optical system is in focus for the object.

Another object of the present invention is to provide a more advantageous form of focus detecting apparatus employing the focus detecting method which has been described above.

Under such object, according to an embodiment of the present invention, as the above-described focus detecting method is put into practice, it is proposed to construct focus detecting apparatus in a more advantageous form which comprises first and second light sensitive element groups each including the same number of light sensitive elements arranged to receive image forming light beams from an image forming optical system to be focused on an object, optical means positions in front of said first and said second light sensitive element groups to establish a substantially conjugate relation of the first and the second light sensitive element groups to respective prescribed exit pupil areas lying almost symmetrical to each other with respect to the optical axis of the image forming optical system, correlation means respective of the outputs of the first and second light sensitive element groups, which outputs represent picture element data about the two sensed images of the object formed with the two light beams from the image forming optical system at the two prescribed exit pupil areas, for correlating predetermined equal numbers of picture elements in the first and second images to each other while shifting the number of picture elements of the first image from its one end to its opposite end and the number of picture elements of the second image from its one end which is opposite to the one end of the first image to its opposite end, each by a predetermined number of picture elements, and optimum correlation position detecting means responsive to the occurrence of an optimum correlation during the course of sequential correlations in each cycle of operation of the correlation means for producing an output representative of the mutual positional relationship between the numbers of picture elements, whereby the output of said optimum correlation position detecting means is used in discriminating whether or not the image forming optical system is in focus for the object.

It is to be noted here that in such focus detecting apparatus, particularly regarding one example of a practical optical construction and arrangement of the optical means and first and second light sensitive element groups in relation to the image forming optical system, according to one embodiment of the present invention to be described more fully later, it is proposed that as the optical means use is made of the corresponding number of lens elements to the number of light sensitive elements in each group as arranged at or near the prescribed focal plane of the image forming optical system, with each individual lens element cooperative with one of the light sensing elements in each group. Therefore, all the lens elements correspond to the respective pairs of light sensitive elements certain ones of which are included in the first group, and others of which are included in the second group. At this time, each pair of light sensitive elements are positioned in almost conjugate relation to the respective two prescribed exit pupil areas of the image forming optical system with respect to the corresponding one of the elements, so that the first and second groups of light sensitive elements are laid in almost conjugate relation to the two prescribed exit pupil areas of the image forming optical system, respectively. This proposal is particularly suited for the optical construction and arrangement of the two-image sensing system in the focus detecting apparatus of the character described above.

Still another object of the present invention is to provide a more advantageous method of focus adjustment of the image forming optical system on an object, by using the above-described focus detection method.

Under such object, according to an embodiment of the present invention, a more advantageous focus adjusting method utilizing the focus detecting method described above is proposed, in which while a correlation between every one pair of predetermined numbers of picture elements of the first and second images is sought, the image forming optical system is adjusted in position so as to produce an optimum correlation when the predetermined number of picture elements are at least in the neighborhood of the center of the area of each of the first and second sensed images, thus completing the focus adjusting operation of the image forming optical system on the object.

A further object of the present invention is to provide a more advantageous form of focus adjusting apparatus employing such focus adjusting method as described above.

And under such object, according to an embodiment of the present invention, as the form of the focus adjusting apparatus for putting such focus adjusting method as described above into practice, a more advantageous form of the focus adjusting apparatus is proposed which differs slightly from the construction of the above-described focus detecting apparatus, in which there is provided in-focus detecting means for producing an in-focus signal when the optimum correlation occurs between the predetermined numbers of picture elements located at least in the neighborhood of the center of the area of each of the first and second sensed images, as the correlation means is performing sequential correlations between each pair of predetermined numbers of picture elements described above.

These and other objects and features of the present invention will become apparent from the following detailed description of embodiments thereof taken in conjunction with the accompanying drawings.

BRIEF DESCRIPTION OF THE DRAWINGS

In the following, the present invention will be described in connection with preferred embodiments thereof by reference to the drawings.

FIGS. 9A, 9B, 10A and 10B are partial circuit diagrams showing four different examples of the discrimination of the various focusing conditions, that is, in-focus, near focus and far focus conditions, and their indications.

DETAILED DESCRIPTION OF THE PREFERRED EMBODIMENTS

Figure 1:
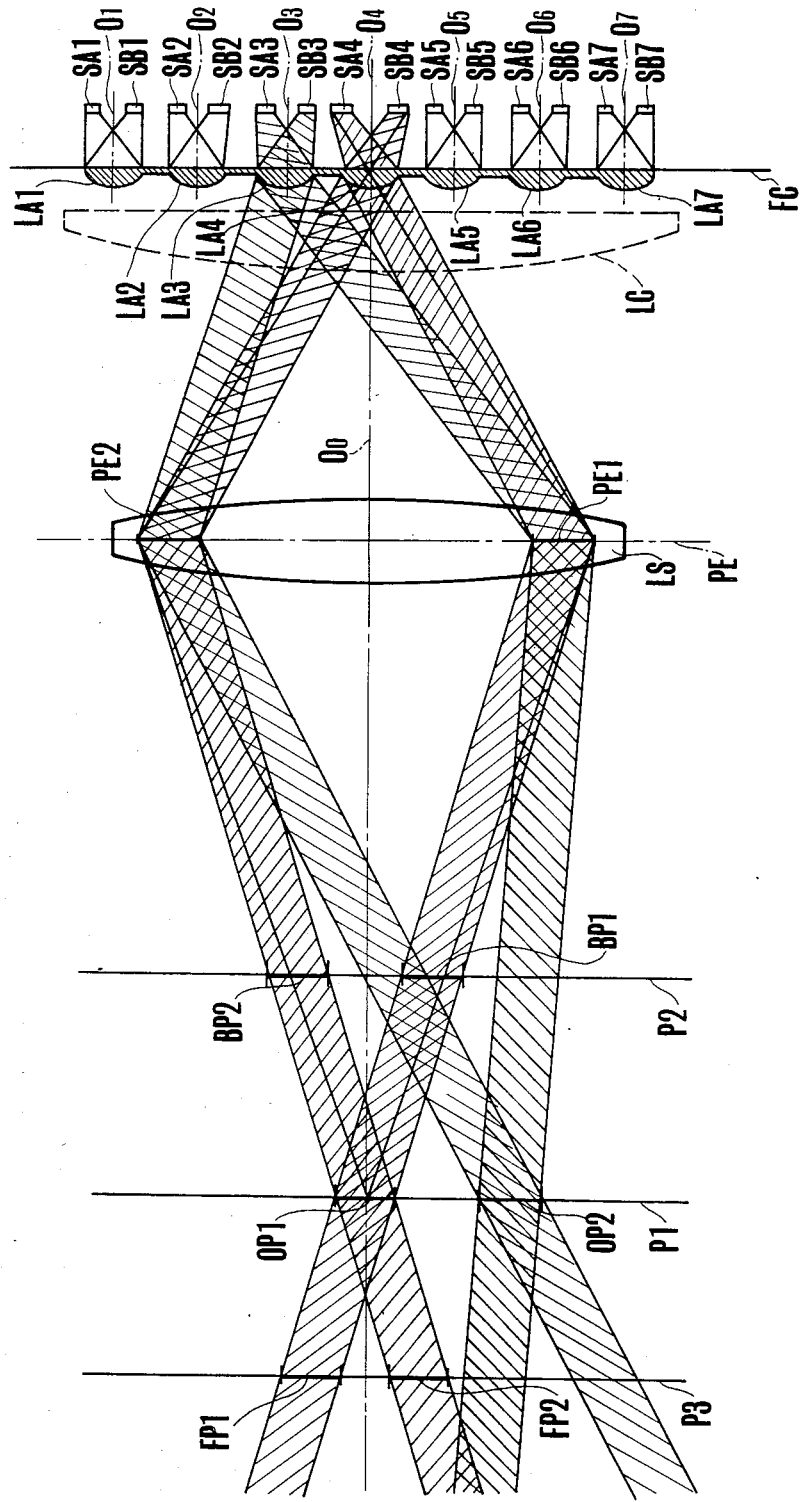
FIG. 1 is a diagram showing an example of an optical arrangement of a two-image sensing system in one embodiment of the present invention.

First, explanation is given to the optical construction and arrangement of a two-image sensing system in one embodiment of the present invention, by reference to FIG. 1. In the optical arrangement shown in the figure, LS denotes an objective lens as the image forming optical system, and LA1–LA7 are a plurality of (in this instance, seven) lens elements arranged linearly in coincidence with the prescribed focal plane FC (or a plane near it) of the objective lens LS with their optical axes $O_1$–$O_7$ almost parallel to the optical axis $O_0$ of the objective lens LS. It is noted that these lens elements or lenslets LA1–LA7 are fabricated, for example, in a common transparent substrate of synthetic resin (for example, acrylic resins) and through shown in an enlarged scale are made very small in actual practice. Behind each lens element LA1, LA2 . . . , LA7 there are shown one pair of light sensitive elements SA1–SB1, SA2–SB2, . . . , SA7–SB7 arranged in almost coincidence with the focal plane of the respective lens element LA1, LA2, . . . , LA7 at locations almost symmetrical to each other with respect to the respective optical axis $O_1$, $O_2$, . . . , $O_7$ of the lens element, as shown in FIG. 1. That is, for a further detailed explanation of this arrangement, among the sensitive elements in all the pairs SA1–SB1 to SA7–SB7 cooperative with the respective lens elements LA1 to LA7, the one-sided light sensitive elements SA1 to SA7 are made almost conjugate to a first prescribed pupil area PE1 in the exit pupil plane PE of the objective lens LS by the respective lens elements LA1 to LA7, and the other light sensitive elements SB1 to SB7 are also made almost conjugate to a second prescribed exit pupil area PE2 almost symmetrical in position to the first one PE1 with respect to the optical axis by the same lens elements LA1 to LA7.

It is further noted that, in practice, the establishment of such conjugate relationship is facilitated by the use of a field lens LC of relatively weak power positioned in front of the lenslet group as shown by dashed lines in the figure.

That is, in such arrangement, of the light sensitive elements SA1–SB1 to SA7–SB7 as paired, elements SA1 to SA7 constitute a first light sensitive element group for picking up, in a minute picture element unit, a first image of an object formed with a light beam from the objective lens LS at the first prescribed exit pupil area PE1, and the other light sensitive elements SB1 to SB7 constitute a second light sensitive group for picking up, in a minute picture element unit, a second image of the same object formed with a light beam from the objective lens at the second prescribed exit pupil area PE2 lying almost symmetrical to the first area PE1. And, the lenslets LA1 to LA7 (and the field lens LC) constitute optical means for laying the first and second light sensitive element groups in almost conjugate relation to the first and second prescribed exit pupil areas PE1 and PE2 almost symmetric to each other with respect to the optical axis of the objective lenslet LS, respectively.

Figure 2:
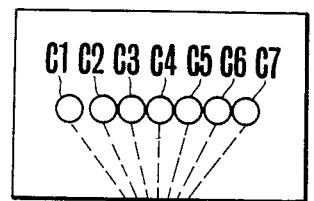
FIG. 2(a)-(d) are a schematic view which illustrate in the in- and out-of-focus detecting principle of the system of FIG. 1 with the change in the selection of picture elements by the particular pair of light sensitive elements resulting from the change in the focusing condition of the image forming lens.
Figure 2:
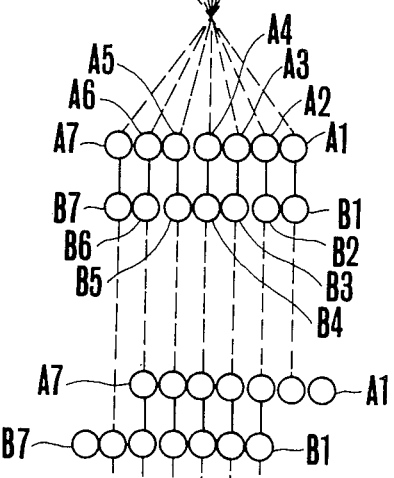
Figure 2:
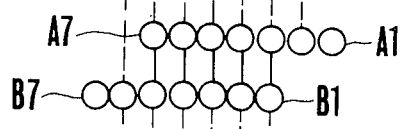
Figure 2:
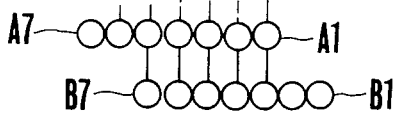

Then, such arrangement operates as follows. Now assuming that the object lens in coincidence with the object plane P1, and, at this time, the objective lens LS is adjusted to in-focus position for that object plane P1, then, for example, the lenslet LA4 focuses the two beams coming from a common minute portion OP1 through the prescribed exit pupil areas PE1 and PE2 onto the light sensitive elements SA4 and SB4, the element pair associated with lenslet LA4, respectively. Again, for example, the light sensitive elements SA3 and SB3 paired with each other and associated with the lenslet LA3 are caused to receive respective images of one and the same minute object portion OP2. Exactly the same phenomenon as this occurs at each of the other combinations of the lenslets with the light sensitive element pairs, except for the difference of the position of the minute object portion selected. That is, this situation may be depicted as in FIGS. 2(a) and 2(b), where various picture compartments C1 to C7 in the field of view are related to the image receiving areas A1–B1, A2–B2 . . . , A7–B7 for the pairs of light sensitive elements SA1–SB1 to SA7–SB7 in coincidence with each other. As will be understandable from this also, in this focus condition, the outputs of the light sensitive elements SA1–SB1 to SA7–SB7 are made equal to each other in each pair. Therefore, the detection of a coincidence of the outputs of the light sensitive elements in every pair can determine the in-focus condition of the objective lens LS.

Alternately, assuming that whilst the objective lens LS is in focus on the object plane P1, an object exists in coincidence with a nearer object plane P2 than the plane P1, that is, a far focus condition prevails, then, for example, the lenslet LA4 focuses a light beam from a minute portion BP1 of the object through the first exit pupil area PE1 onto one of the pair of light sensitive elements SA4 and SB4 associated therewith, say, the light sensitive element SA4. Thus, an image of that minute object portion BP1 is picked up by the light sensitive element SA4, and a light beam from a different minute portion BP2 of the of the same object passes through the second exit pupil area PE2 onto the light sensitive element SB4, so that an image of that different object portion BP2 is picked up by the light sensitive element SB4. Further, at this time, a similar phenomenon to this except the difference of the position of the minute picture elements selected occurs for each of the other lenslets with the corresponding one of the other pairs of light sensitive elements. That is, such situation in terms of the relation between the picture compartments and the light receiving regions of the individual light sensitive elements SA1 to SA7 to SB1 to SB7 is illustrated in FIG. 2(c). As shown, the minute picture elements C1 to C7 in the field of view illustrated in FIG. 2(a) take different places between the image receiving regions A1 to B1 to B7 for the light sensitive elements SA1 to SA7 and SB1 to SB7 as shifted from each other in groups.

Conversely, assuming that whilst the objective lens remains in sharp focus on the object plane P1, the object changes its position from the plane P1 to a farther object plane P3 (that is, near focus condition), then, for example, the lenslet LA4 causes one of the pair of light sensitive elements associated therewith, SA4 to receive a light beam from a minute object portion FP1 and therefore an image of that portion FP1, and the other light sensitive element SB4 to receive a light beam from a minute object portion FP2, and therefore an image thereof. And, at this time, the other lenslets also cause their associated pairs of light sensitive elements to receive images of different object portions in every pair. That is, this situation is represented by the relation between the picture compartments of FIG. 2(a) and the light receiving regions of various light sensitive elements SA1 to SA7 and SB1 to SB7 as in FIG. 2(d). As will be understandable from this, the above two situations lead to differ the outputs of the light sensitive elements in every pair SA1-SB1, ..., SA7-SB7 from each other. Therefore, the detection of an inequality of the outputs of each pair of light sensitive elements SA-1-SB1 to SA7-SB7 determines when the objective lens is out of focus.

Figure 3:
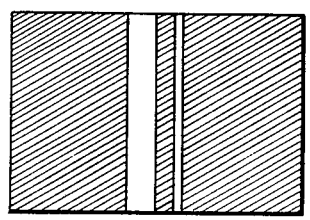
FIG. 3(a)-(d) is a schematic views showing a particular object pattern, with corresponding video signals from the first and second light sensitive element groups in accordance with a change in the focus condition of the image forming lens.
Figure 3:
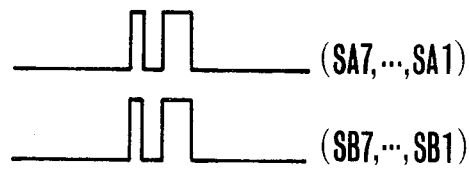
Figure 3:
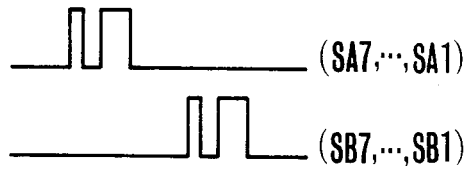
Figure 3:
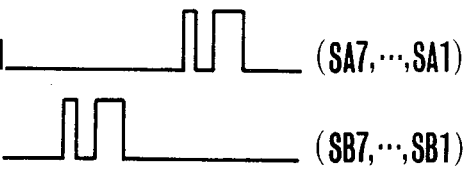

Taking an example of a pattern of the object, FIG. 3 depicts how to transform each of the above focus conditions to a relation between the outputs of the first and second groups of the light sensitive elements SA and SB. That is, FIG. 3(a) represents one model of the object pattern (light and dark pattern) in the field of view for detection. With the as-sensed object of such pattern, when the objective lens LS is in a sharp focus condition, the outputs of the first and second light sensitive element groups SA and SB appear as the waveforms of FIG. 3(b). On the other hand, when in a far focus condition, the outputs are changed as shown in FIG. 3(c), as well as when in a near focus condition, as shown in FIG. 3(d). That is, as is understandable from FIGS. 3(b) to 3(d), when in the in-focus condition, the two images formed with the two light beams from the two prescribed exit pupil areas PE1 and PE2 of the objective lens LS, which lie almost symmetrical to each other with respect to the optical axis, assume positions of sharp focus coincident with each other, while when in the far focus condition, their positions of sharp focus are changed by becoming separated symmetrically from each other to the left and right. When in the near focus condition, their positions of sharp focus after having been exchanged in positional relationship are changed by becoming separated symmetrically from each other to the right and left.

Now, for example, in such optical arrangement of the two-image sensing system as shown in FIG. 1, depending upon the focusing condition of the objective lens LS for the bject, the mutual positional relationship of the two sensed images of that object formed with the two light beams from the objective lens LS, at the prescribed exit pupils PE1 and PE2 axially symmetric to each other on the prescribed focal plane FC, is changed. This mutual positional relationship can be detected through the comparison of the outputs of the first and second light sensitive element groups SA and SB. In this connection, it should be pointed out that in the method of the present invention, this detection of the mutual positional relationship of the two sensed images is based on the picture element data obtained by the outputs of the individual light sensitive elements in the first and second groups, by seeking a correlation in a minute picture element of the image as a base.

Figure 4:
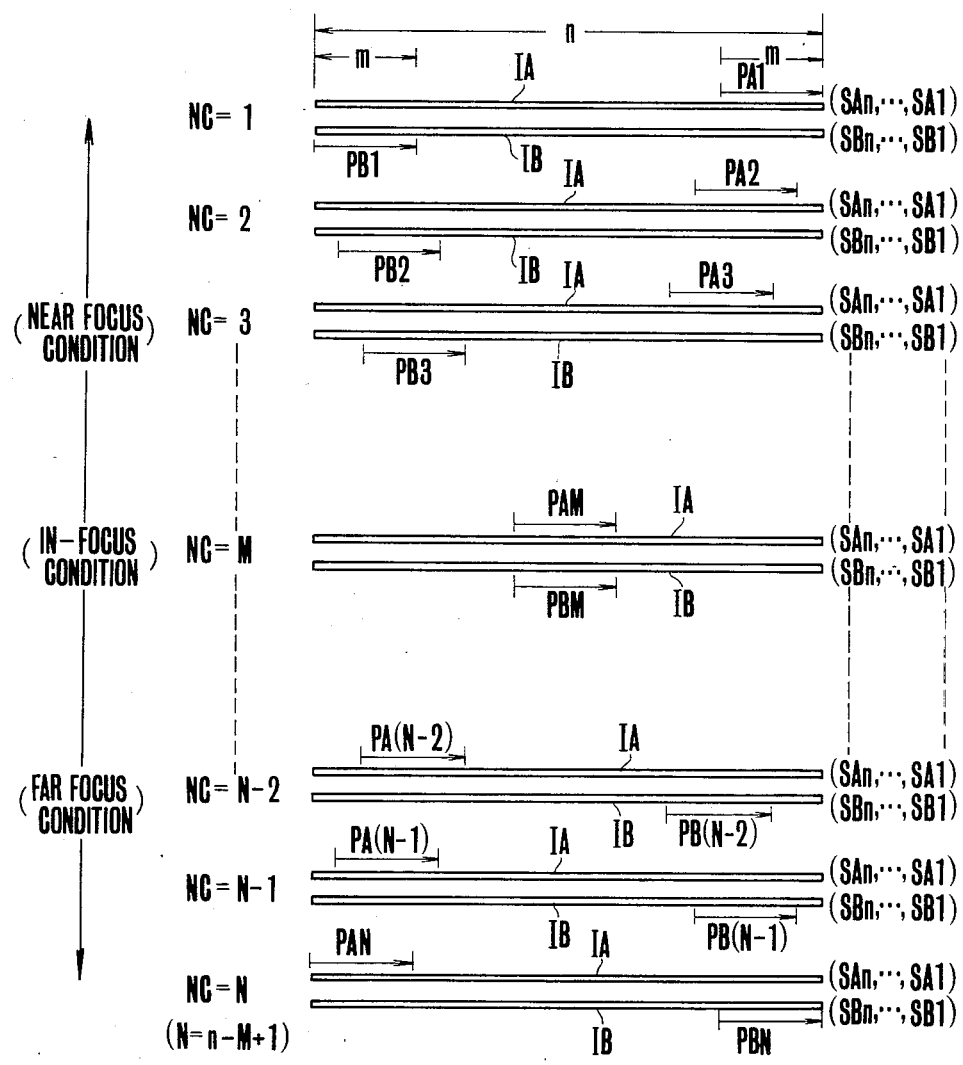
FIG. 4 is a schematic view which illustrates the correlation detecting method and the principle of focus detection according to the present invention.

Explanation of the detection mentioned above, is given by reference to FIG. 4. First, in the construction and arrangement of FIG. 1, the number of lenslets and the number of pairs of light sensitive elements associated therewith are assumed to be n, and, therefore, n picture element data for each of the first and second sensed images are obtained. In the present invention, it is on these n picture element data that a correlation between the first and second sensed images is sought. As its technique, for example, as shown in FIG. 4, first, for the first sensed image IA, a predetermined number of, for example, m ($<<$n) successive picture elements counting from its right end which constitute an image portion PA1, and for the second sensed image, an image portion PB1 including the same number of, that is, m successive picture elements but counting from the opposite or left side are selected for seeking a correlation between the first and second sensed images. Then, after this first cycle of correlation detection has been completed, a shifting to the left for the first sensed image IA and a symmetric shifting to the right for the second image sensed are caused to take place by advancing a predetermined number of picture elements (for example, one picture element). At this time, a correlation between the image portions PA2 and PB2 is sought. Such procedures is repeated until the detection of a correlation between the last image portions PNA and PBN each including m successive picture elements counting from the left for the first sensed image IA and from the right for the second sensed image IB is completed, while the number of cycles of correlation detection between the image portions of the first and second sensed images completed is counted. At a time during the course of the correlation detecting operation between the individual image portions in the first and second images sensed, when an optimum correlation is obtained, the resultant number of cycles counted determines the focusing condition of the objective lens LS to that object. That is, in FIG. 4, NC designates the number of cycles of correlation detection, and N is given by $N=n-m+1$, provided that the amount of shifting of each image portion in the first and second images IA and IB is one picture element. And, at this time, if N is an odd number, (that is, n−m is an even number), it is in the cycle numbered by $$NC = M = \frac{N+1}{2} = \frac{n-m}{2} + 1$$

that image portions PAM and PBM lying at the centers of the areas of the first and second sensed images IA and IB respectively are subjected to the detection of correlation. Here, as will be understandable from the description in connection with FIGS. 2 and 3, if the optimum correlation is obtained when in the M-th cycle of correlation detection, the objective lens LS is determined to be at this time in sharp focus condition on the object. Otherwise, when the optimum correlation is obtained in a faster cycle of correlation detection NC<M, it lies in a near focus condition, and when the optimum correlation is obtained in a later cycle of correlation detection NC<M, it lies in a far focus condition. Thus, it is made possible to determine the focusing condition of the objective lens LS.

It is to be noted that though the above explanation is made in connection with the sequential shifting beginning with the rightmost image portion PA1 for the first sensed image IA and with the leftmost image portion PB1 for the second sensed image, and terminating at the leftmost image portion PAN for the first sensed image IA and at the rightmost image portion PBN for the second sensed image IB, these directions of sequential shifting may be reversed so that the first image IA is scanned from the left beginning with the leftmost portion PAN thereof and the second image IB from the right beginning with the rightmost portion PBN thereof, until the rightmost and leftmost portions PA1 and PB1 are reached, respectively. In this case, if the optimum correlation is obtained in a faster or earlier cycle NC<M, the objective lens LS is determined to lie at this time in a far focus condition to that object, and when the optimum correlation is obtained in a later cycle NC>M, it is determined to lie at this time in a near focus condition. It is further noted that, as will be understood from the above, though it is most ideal that the occurrence of the optimum correlation only in the M-th cycle of correlation detection defines the in-focus condition, this in actual practice presumes to give rise to many problems. Therefore, in practice, this must be determined by taking into account the number of pairs of light sensitive elements, that is, the size of the picture element made as the base of correlation, the depth of field of the objective lens and the like, but it is advantageous that the sharp focus is defined in terms of a range: $M-\alpha<NC<M+\alpha$, that is, by $NC \div M$.

Figure 5:
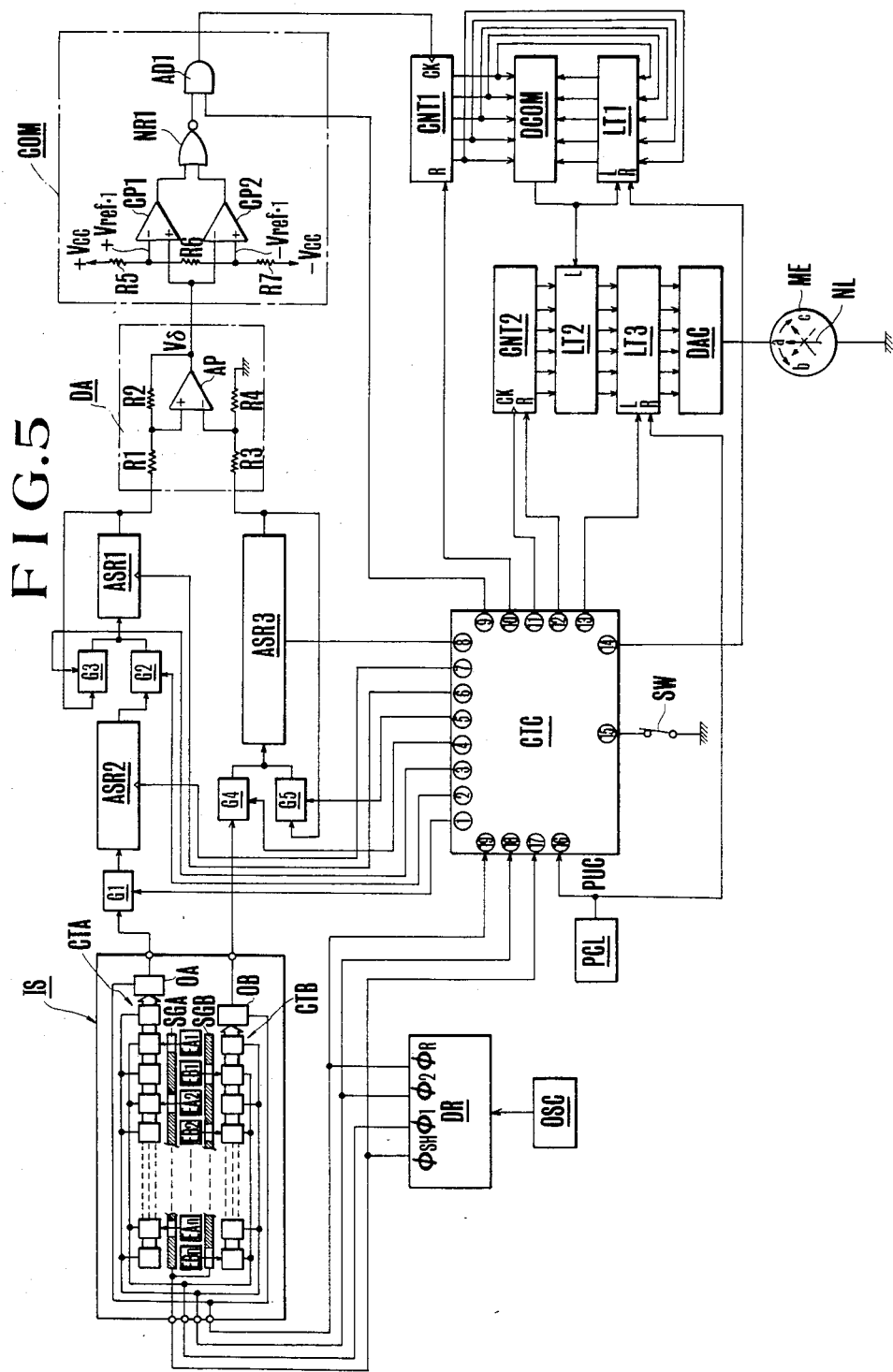
FIG. 5 is a block diagram showing in particular the circuit system of one embodiment of the present invention.
Figure 6:
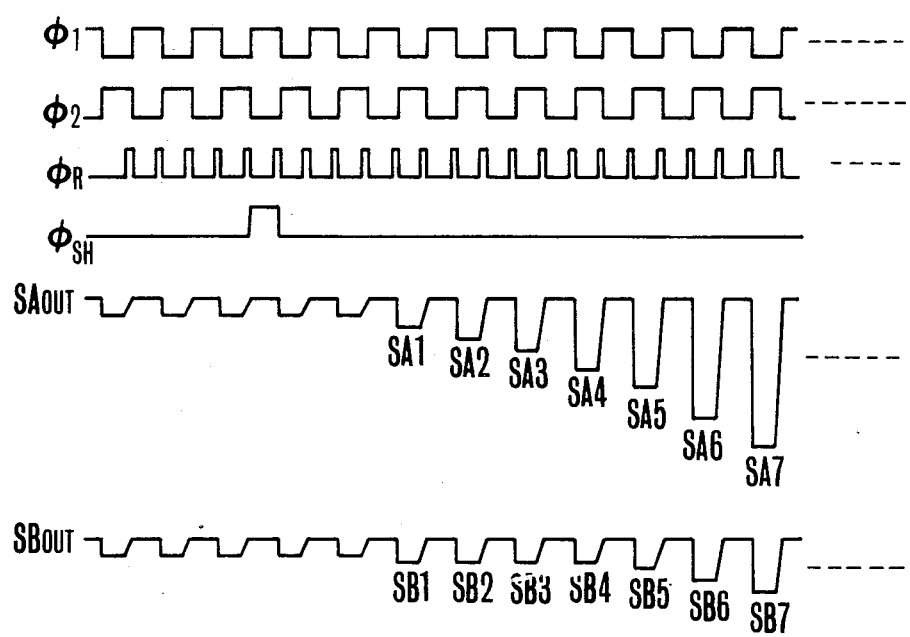
FIG. 6 is a pulse timing chart showing the relationships between outputs from a sensor driver, and video signals from an image sensor, in the circuit system of FIG. 5.

Next, explanation about an example of construction of an apparatus for carrying out the detection method described above, particularly regarding an electrical system, is given by reference to FIG. 5. In the figure, IS is a linear image sensor having n pairs of sensor elements EA1-EB1, EA2-EB2, . . . , EAn-EBn serving as the respective light sensitive elements SA1-SB1, . . . , SAn-SBn in the light sensitive element groups SA and SB of FIG. 4. CTA is a charge transfer portion for taking in all the signal charges of the sensor elements EA1-EAn through a shift gate SGA and transferring these up to an output portion OA (charge-voltage converting portion); CTB is a similar charge transfer portion for taking in all the signal charges of the sensor elements EB1--EBn through a shift gate SGB and transferring these up to an output portion OB (charge-voltage converting portion). The charge transfer portions CTA and CTB are fed with transfer clock pulses $\phi 1$ and $\phi 2$, output portions OA and OB with a charge resetting pulse $\phi R$, and the shift gates SGA and SGB with a shift pulse $\phi SH$ (this is synchronous to $\phi 1$), all from a sensor driver DR (see FIG. 6). That is, the image sensor IS is of the two-phase drive type, and, as shown in FIG. 6, the signal voltages based on the individual signal charges of the sensor elements EA1-EAn and EB1--EBn are both simultaneously read out in $\phi 2$-synchronism and serially in time. A standard clock oscillator OSC provides clock pulses. The sensor driver DR produces the pulses $\phi 1$, $\phi 2$, $\phi R$ and $\phi SH$ based on the standard clock pulses from the oscillator OSC. For this purpose, as is well known, the oscillator OSC is provided with a frequency divider, logic gates and the like. It is noted that the sensor driver DR is here constructed so that the production of the shift pulse $\phi SH$ is recycled in a predetermined period. For this reason, the charge accumulation time (or the signal integration period) of each of the sensor elements EA1 to EAn and EB1 to EBn in the image sensor IS is fixed.

CTC is a control circuit responsive to a start signal (OFF signal) from a focus detection operation start switch SW, a power-up clear pulse PUC from a power-up clear circuit PCL, and the shift pulse $\phi SH$, transfer clock pulse $\phi 2$ and reset pulse $\phi r$ from the sensor driver DR, these signals and pulses are supplied at input terminals numbered 15, 16, 17, 18 and 19 respectively, for controlling the operation of the circuit system of FIG. 5. An m-bit analogue shift register ASR1 stores m analogue picture element data out of the n picture element data on the first sensed image IA obtained by the sensor elements EA1 to EAn which are used in each cycle of correlation detection. An (n-m)-bit analogue shift register ASR2 stores the other (n-M) analogue picture element data, and an n-bit analogue shift register ASR3 stores the output from the output portion OB of the image sensor IS, that is, n picture element data on the second sensed image IB obtained by the sensor elements EB1 to EBn. These registers constitute memory means for memorizing the n picture element data on each of the first and second sensed images IA and IB and are driven by drive pulses from terminals numbered 6, 7, and 8 of the control circuit CTC respectively. A data read-in control analogue gate G1 is positioned in the input stage of the analogue shift register ASR2; and data read-in control and data recirculate control analogue gates G2, G3, respectively, are positioned in the input stage of the analogue shift register ASR1. Data read-in control and data recirculate control analogue gates G4, G5, respectively, are positioned in the input stage of the analogue shift register ASR3, these analogue gates G1 to G5 being controlled by gate control signals from terminals numbered 1, 2, 3, 4 and 5 of the control circuit CTC respectively. DA is a differential amplifier circuit which operates as a difference detecting circuit for detecting a difference between both output data in every bit (that is, every picture element) as the data in the analogue shift registers ASR1 and ASR3 are recirculated. Amplifier DA includes an operational amplifier AP and resistors R1 to R4 connected to one another as shown in the figure. A comparator circuit COM compares the difference output $V\delta$ with a reference voltage range of from $+Vref.1$ to $-Vref.1$, and only when $-Vref.1 < V\delta \leq +Vref.1$ produces a high level pulse at a time corresponding to the recirculation shift of the picture element data in the shift registers ASR1 and ASR3. Circuit COM includes a first comparator CP1 receptive to its non-inversion input of the difference output $V\delta$ from the differential amplifier circuit DA, and at its inversion input of the reference voltage $+Vref.1$ set by the resistors R5 and R6 for producing a low level signal only when $V\delta \leq +Vref.1$. A second comparator CP2 is receptive at its inversion input of the difference output $V\delta$ from the differential amplifier circuit DA and at its non-inversion input of the reference voltage $-Vref.1$ set by the resistors R6 and R7 for producing a low level signal only when $-Vref.1 \leq V\delta$. A NOR gate NR1 takes the inverted logic sum of the outputs of the first and second comparators CP1 or CP2 to produce a high level signal only when $-Vref.1 \leq V\delta + Vref.1$, and an AND gate AD1 takes the logic product of the output of the NOR gate NR1 and a pulse which is timed corresponding to the drive of the analogue shift registers ASR1 and ASR3 from a terminal numbered 9 of the control circuit CTC, to produce a high level pulse at a time corresponding to the recirculation shift of the picture element data in the analogue shift registers ASR1 and ASR3 when $-Vref.1 \leq V\delta \leq +Vref.1$. A binary counter CNT1 of the falling edge synchronization type detects the degree of correlation by counting the number of high level pulses from the comparator circuit COM during one recirculation of data of the analogue shift register ASR1. Here, the differential amplifier circuit DA, comparator circuit COM and counter CNT1 constitute correlation detection means for detecting the degree of correlation between the image portions PA and PB, each portion including m picture elements in the first and second sensed image IA and IB based on the m picture element data stored in the analogue shift register ASR1 and the m picture element data stored in the first (that is, output terminal side) m bits of the analogue shift register ASR3, respectively. At this time, the output of the counter CNT1 represents an index for the correlation degree (or similarity) between the image portions PA and PB each including m picture elements in the first and second sensed images IA and IB each time the correlation is detected. It is noted that the counter CNT1 is reset either when the electrical power switch is turned on, or each time one cycle of correlation detection is terminated, that is, each time the data recirculation in the analogue shift register ASR1 is completed. This occurs when a reset pulse from a terminal numbered 10 of the control circuit CTC is applied to the counter CNT1.

FIG. 5 also shows a resettable latch circuit LT1 which serves as a memory circuit for latching the output of the counter CNT1; a digital comparator DCOM which serves as a comparing circuit for comparing the counted value from the counter CNT1 with the content of the latch circuit LT1 and, upon every occurrence of the fact that "the counted value of the counter CNT1 > the content of the latch circuit LT1", produces a latch signal which causes the counted volume of the counter CNT1 to be latched by the latch circuit LT1. Here, the digital comparator DCOM and latch circuit LT1 constitute optimum correlation detecting means for detecting an optimum correlation. It is noted that the latch circuit LT1 is reset by a reset pulse from a terminal numbered 14 of the control circuit CTC either when the electrical power switch is turned on, or each time one cycle of focus detecting operation is completed.

A binary counter CNT2 of the falling edge synchronization type counts a count-up pulse produced from a terminal numbered 11 of the control circuit CTC upon each correlation detection between the stored data on the analogue shift register ASR1, and the stored data on the first (that is, output terminal side) m bits of the analogue shift register ASR3, so that the above-described number of correlation detection cycles NC by the correlation detection means (DA, COM, CNT1) is counted. A latch circuit LT2 serves as a memory circuit responsive to a latch signal from the digital comparator DCOM for latching the counted value of the counter CNT2 each time the fact that "the counted value of the counter CNT1 > the content of the latch circuit LT1" occurs. Here, the digital comparator DCOM, the counter CNT2 and latch circuit LT2 constitute optimum correlation position detecting means for detecting the mutual positional relationship between the image portions PA and PB which occurs when the optimum correlation is obtained, that is, the mutual positional relationship between the first and second sensed images IA and IB. At this time, the output of the latch circuit LT2 represents the optimum correlation position. It is noted that the counter CNT2 is reset by a high level pulse from a terminal numbered 12 of the control circuit CTC either when the electrical power switch is turned on, or each time the cycle of the focus detecting operation is completed. A resettable latch circuit LT3 serves as a final memory circuit for latching the output of the latch circuit LT2, and is controlled by a latch signal from a terminal numbered 13 of the control circuit CTC in such a manner that each time one cycle of the focus detecting operation is completed, the output of the latch circuit LT2 is latched. It is noted that the latch circuit LT3 is arranged to be reset by the power-up clear pulse PUC from the power-up clear circuit PCL when the electrical power source turned on. A D/A convrter DAC converts the digital output of the latch circuit LT3 to a corresponding analogue signal (for example, voltage). A meter ME responds to the output of the D/A converter DAC for indicating the degree of focus.

Next, an explanation is given of the operation of the circuit system of the construction described above.

First, when a power source switch (not shown) is turned on, the power supply to the circuit system of FIG. 5 is activated and the power-up clear circuit PCL produces the power-up clear pulse PUC which is applied to reset the control circuit CTC and latch circuit LT3. The, the concurrent reset pulses from the terminals numbered 10, 12 and 14 of the control circuit CTC are applied to reset the counters CNT1 and CNT2 and latch circuit LT1. Such power supply also causes the oscillator OSC to start oscillation, so that the sensor driver DR starts to produce pulses $\phi 1$, $\phi 2$ and $\phi R$, and produces shift pulses $\phi SH$ at a predetermined frequency. Therefore, the output of the image sensor IS is repeatedly read out in a predetermined period. It is noted that in this state the control circuit CTC produces gate control signals at the terminals numbered 1, 2, 3, 4 and 5 thereof, causing all the gates G1 to G5 to be set in their OFF conditions, and cuts off the production of drive pulses at the terminals numbered 6, 7 and 8 for the analogue shift registers ASR1 to ASR3, so that the output of the image sensor IS read out in this state is discarded without being stored in the analogue shift registers ASR1 to ASR3.

Then, when the start switch SW is opened, the start signal is given to the control circuit CTC through its terminal numbered 15. The control circuit CTC, responsive to the start signal and the pulses φSH, φ2 and φR supplied at the terminals numbered 17, 18 and 19 for producing the gate control signals at the terminals numbered 1, 2 and 4 in synchronism with the production of effective video signals, causes the gates G1, G2 and G4 to be intermittently turned on at the time of the transfer clock pulse φ2, and produces n drive pulses at each of the terminals numbered 6, 7 and 8 for the analogue shift registers ASR1 to ASR3 in synchronism with the transfer clock pulse φ2. Therefore, n picture element data for the first sensed image IA, obtained by the n sensor elements EA1 to EAn in the first sensor element group EA in the image sensor IS, are stored or sampled in the analogue shift registers ASR1 and ASR2 through the gates G1 and G2. Also, n picture element data for the second sensed image IB obtained by the n sensor elements EB1 to EBn in the second sensor element group EB are stored or sampled in the analogue shift register ASR3 through the gate G4. Then, when the storage or sampling of the n picture element data for each of the first and second sensed images IA and IB in the analogue shift registers ASR1, ASR2 and ASR3 is completed, the control circuit CTC produces the gate control signals at the terminals numbered 1, 2 and 4, which are applied to set the gates G1, G2 and Ga4 in OFF conditions, and while cutting off the production of drive pulses at the terminals numbered 6 and 7 for the analogue shift registers ASR1 and ASR2, at this time, produces the gate control signal at the terminal numbered 5. Thus, only the gate G5 is turned on intermittently at the timing of the transfer clock pulse φ2. Subsequently, drive pulses are produced at the terminal numbered 8 only for the analogue shift register ASR3. Therefore, only the analogue shift register ASR3 is caused to recirculate its stored data through the gate G5. Control circuit CTC, upon application of (n-m) drive pulses, causes the stored data of the analogue shift register ASR3 to be recirculately shifted so that the m-bit which lay at first in the leftmost end portion, (that is, the input terminal side) of the register ASR2. That is, the m picture element data about the image portion PB1, lying at the left end of the second sensed image IB shown in FIG. 4, is shifted to the rightmost end, i.e., the output terminals side, of the register ASR3. At this point in time, the control circuit CTC produces an φ2-synchronized count up pulse at the terminal numbered 11 for causing the counter CNT2 to advance one count up (thereby "NC=1" is memorized in CNT2). On the other hand, the control circuit CTC starts to produce at the terminals numbered 3, 6 and 9 the φ2-synchronized gate control signals and drive pulses, and continues to produce at the terminals numbered 5 and 8 the φ2-synchronized gate control signal and drive pulse. Therefore, while this causes the recirculation shift of the stored data in the analogue shift register ASR3 to further proceed, it is in synchronism with this that the stored data in the analogue shift register ASR1 (the stored data in the analogue shift register ASR1 occuring at this point in time are the m picture element data on the rightmost image portion PA1 in the first sensed image IA shown in FIG. 4) are caused to recirculate shift through the gate G3. When the recirculate shift of the stored data in the analogue shift registers ASR1 and ASR3 is being performed, the differential amplifier circuit DA detects a difference Vδ between the data produced from the analog shift registers ASR1 and ASR3 in every bit by bit. At this time, the comparator circuit COM, responsive to the occurrence of only the fact that the difference output Vδ from the differential amplifier circuit DA, as compared to the reference voltage levels +Vref.1 satisfies −Vref.1 ≦Vδ<Vref.1, produces a high level pulse in response to a φ2-synchronized pulse signal from the terminal numbered 9 of the control circuit CTC. The concurrent output pulse from the comparator circuit COM is counted by the counter CNT1. When the counter CNT1 has counted the output pulse from the comparator circuit COM, it is at this time that the digital comparator DCOM compares the value of the counter CNT1 with the content of the latch circuit LT1, and upon every occurrence of the fact that "the counted value of the counter CNT1 the content of the latch circuit LT1", produces a latch signal for causing, on every occasion, the counted value of the counter CNT1 to be latched in the latch circuit LT1, and the counted value of the counter CNT2 at that time to be latched in the latch circuit LT2. Thus, at a time when the first cycle of process of the stored data of the analogue shift register ASR1 is terminated, the correlation detection between the image portion PA1 of the first sensed image IA and the image portion PB1 of the second sensed image IB, explained in connection with FIG. 4, is terminated. This leaves a datum representing the concurrent correlation degree in the latch circuit LT1. If the correlation degree at this time is larger than "0", because of the fact that at first the content of the latch circuit LT1 is "0", the latch circuit LT2 is caused to memorize the number of correlation detection cycles "NC=1". When one recirculation of the stored data of the analogue shift register ASR1 is terminated, the control circuit CTC produces a φ2-synchronized reset pulse at the terminal numbered 10 which is applied to reset the counter CNT1, and a gate control signal at the terminal numbered 3 which is applied to set the gate G3 to OFF condition. On the other hand, the control circuit CTC produces at the terminals numbered 2, 6 and 7 the gate control signal and drive pulse (these are all made equivalent to one transfer clock pulse φ2) to effect one-bit shift of the stored data in the analogue shift registers ASR2 and ASR1, thereby the first bit data of the analogue shift register is taken in the last bit of the analogue shift register ASR1 through the gate G2. Thus, stored in the analogue shift register ASR1 are m picture element data about the image portion PA2 in the first sensed image IA of FIG. 4. On the other hand, at a time when one recirculation of the stored data of the analogue shift register ASR1 is terminated, the analogue shift register ASR3 also terminates one recirculation of the stored data thereof. At this time, the control circuit CTC even after the termination of one recirculation of the stored data of the analogue shift register ASR3 continues producing the gate control signal and drive pulse at the terminals numbered 5 and 8. Therefore, the stored data of the analogue shift register ASR3 after the termination of one recirculation thereof are caused to recirculate shift in sequence. When in this second recirculation shift of the stored data of the analogue shift register ASR3, the control circuit CTC at this time feeds (n-m-1) drive pulses from the start of recirculation shift of the stored data of the analogue shift register ASR3, so that its stored data is shifted (n-m-1) bits in recirculation. Then, when the m picture element data for the image portion PB2 of the second sensed image IB have been shifted up to the rightmost end, that is, the output terminal side of the register ASR3, the control circuit CTC again produces one count up pulse synchronized with $\phi 2$ at the terminal numbered 11. This causes the counter CNT2 to advance one more count up (this results in the memorization of "NC=2" in the counter CNT2). On the other hand, the control circuit CTC again produces at the terminals numbered 3, 6 and 9 the $\phi 2$-synchronized gate control signals and drive pulses, and subsequently produces at the terminals numbered 5 and 8 the $\phi 2$-synchronized gate control signal and drive pulses. Therefore, while this causes the recirculation shift of the stored data of the analogue shift register ASR3 to go on in sequence, it is in synchronism with this that the stored data of the analogue shift register ASR1 are again shifted in recirculation. At this time, the correlation detecting means composed of the differential amplifier circuit DA, comparator circuit COM and counter CNT1 carries out the detection of the degree of correlation between the first and second sensed images IA and IB at the portions PA2 and PB2 thereof described in connection with FIG. 4. It is noted that in detecting the correlation degree between the image portions PA2 and PB2, when it is found that the counted value of the counter CNT1 is larger than the content of the latch circuit LT1, a latch signal is produced from the digital comparator DCOM. The content of the latch circuit LT1 is then revised to the new counted value of the counter CNT1, and the content of the latch circuit LT2 is revised to a new counted value of the counter CNT2 (at this time, "NC=2"). Otherwise, when the counted value of the counter CNT1 is less than the content of the latch circuit LTL, that is, when the correlation degree between the image portions PA2 and PB2 is lower than that between the image portions PA1 and PB1 detected in the preceding cycle, the rewrite of the contents of the latch circuits LT1 and LT2 is not carried out. Then, when the detection of the correlation degree between these image portions PA2 and PB2 is terminated, the control circuit CTC produces again the $\phi 2$-synchronized reset pulse at the terminal numbered 10 which is applied to reset the counter CNT1, and also produces $\phi 2$-synchronized gate control signal and drive pulses each for one bit at the terminals numbered 2, 6 and 7. Therefore, the stored data in the analogue shift registers ASR2 and ASR1 are shifted one bit to the right. Thus, while m picture element data for an image portion PA3 of the first sensed image IA, as shifted by one picture element from the image portion PA2 to the left, are stored in the analogue shift register ASR1, a subsequent $\phi 2$-synchronized gate control signal and drive pulse are produced at the terminals numbered 5 and 8. The data stored in the analogue shift register ASR3 thereby is recirculated one time, and a third recirculation shift then proceeds. The control circuit CTC when in this third recirculation shift causes the store data in the analogue shift register to be shifted in recirculation by (n-m-2) bits, so that m picture element data about an image portion PB3 of the second image IB, as shifted by one picture element from the image portion PB2 to the right, are shifted to the right end, that is, the output terminal side of the analogue shift register ASR3. At this time, in a manner similar to that described above, the count up pulse from the terminal numbered 11 causes the counter CNT2 to further advance one count up. Thus, "NC=3" is memorized. Also, in synchronism with the subsequent recirculation shift of the stored data of the analogue shift register ASR3, the control circuit CTC produces the gate control signals and drive pulses from the terminals numbered 3 and 6 to cause the stored data in the analogue shift register ASR1 to be shifted in recirculation through the gate G3. Then, at this time, in a manner similar to the above, the correlation detecting means composed of the differential amplifier circuit DA, comparator circuit COM and counter CNT1 carries out the detecting of a correlation degree between the image portions PA3 and PB3.

Such procedure comprising of the steps of a rightward shift by every one bit of the stored data of the analogue shift registers ASR2 and ASR1; counting up of the counter CNT2; when in each recirculation shift of the stored data of the analogue shift register ASR3, at timing advanced by one bit, a synchronous recirculation shift of the stored data of the analogue shift register ASR1; and a correlation detection for every m picture elements by the correlation detecting means comprising the differential amplifier circuit DA, comparator COM and counter CNT1, is repeated until the detection of a correlation degree between the leftmost image portion PAN of the first sensed image IA and the rightmost image portion PBN in the second sensed image IB is terminated. Thus, in conclusion, at a point in time when the detection of the correlation degree between the image portions PAN and PBN is terminated, a datum representing the largest correlation degree between the image portions PA and PB including m successive picture elements in the first and second sensed images IA and IB is left in the latch circuit LT1. Also, left in the latch circuit LT2 is a datum representing the number of correlation detection cycles necessary to attain the optimum correlation, in other words, the mutual positional relationship of those image portions PA and PB which give the optimum correlation, that is, the mutual positional relationship of the first and second sensed images IA and IB on the prescribed focal plane FC. When the last detection of the correlation degree between the image portions PAN and PBN is terminated, the control circuit CTC produces reset pulses at the terminals numbered 10, 12 and 14, by which the counters CNT1 and CNT2 and the latch circuit LT1 are reset. In addition, a latch signal is produced at the terminal numbered 13, causing the content of the latch circuit LT2 to be latched in the latch circuit LT3. When the data is latched in the latch circuit LT3, it is at this time that the D/A converter DAC converts the digital output data of the latch circuit LT3 to analogue data which are applied to the meter ME. Thus, the resultant deflection of a needle NL of the meter ME indicates the mutual positional relationship of the first and second sensed images IA and IB on the prescribed focal plane FC, that is, the focusing condition of the image forming objective lens LS to the object. That is, when the output of the latch circuit LT3 represents $$\text{``}NC = M\left( = \frac{n-m}{2} + 1 \right),$$

the needle NL of the meter ME points a dot "a", when "NC<M", the needle NL is deflected to, for example, a "b" side, and when "NC>M", to a "c" side, as the D/A conversion characteristic of the D/A converter DAC is so preset. As will be understandable from the description in connection with FIG. 5, when the needle NL is placed in registry with the dot "a", the detection of the in-focus condition is indicated, when deflected toward "b" side, the detection of a far focus condition is indicated, and when deflected to the opposite or "c" side, the detection of a near focus condition is indicated. Moreover, when out of focus, the amount of deviation of the needle NL from the dot "a" represents the degree of defocus. The above process repeats itself until the start switch SW is closed. Therefore, during this, the position of the objective len LS may be changed until the needle NL of the meter ME indicates the detection of the in-focus condition, whereupon accurate focusing adjustment of the objective lens LS to the object is effected. It is noted that because of the provision of means to be described more fully later, when the start switch SW is closed at a time during the focusing detecting operation, the concurrent cycle of focus detecting operation is made to continue until that cycle is completed. At the termination of that cycle, a standstill state is taken. It is further noted that the control circuit CTC, after having once caused the picture element data from the image sensor IS to be taken in the analogue shift registers ASR1 to ASR3, maintains the gates G1 and G4 in OFF conditions until one cycle of focus detecting operation based on the stored data in the analogue shift registers ASR1 to ASR3 is terminated. Therefore, even when the image sensor IS again produces picture element data, they are not entered in the analogue shift registers ASR1 to ASR3, but are discarded. If the start switch SW remains open at a point in time when one cycle of focus detecting operation is terminated, then under the logic product condition that the termination of the focus detecting operation and the opening of the start switch SW occurs simultaneously, the picture element data produced from the image sensor IS just after the termination of one cycle of focus detecting operation are again caused to be entered in the analogue shift registers ASR1 to ASR3, so that the next cycle of focus detecting operation is formed based on those stored data. This is repeated so long as the start switch SW is open, as has been mentioned above.

Figure 7:
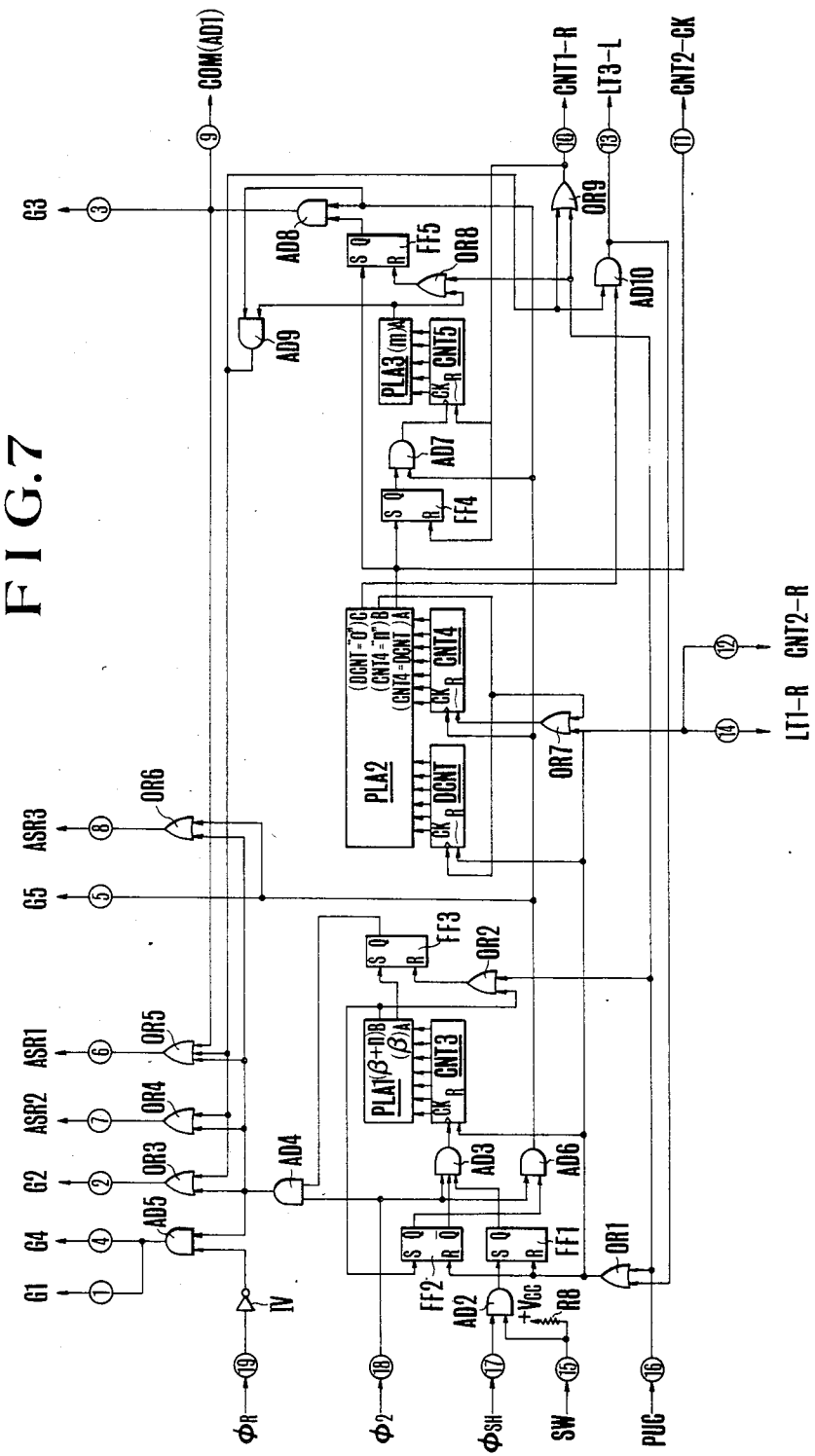
FIG. 7 is a block diagram showing the details of a control circuit in the circuit system of FIG. 5.

Next, FIG. 7 shows the details of construction of the control circuit CTC. That is, in the figure, R8 is a register connected to the terminal numbered 15. Applied to resistor R8 is a voltage +Vcc. Therefore, at a point on connection between resistor R8 and the terminal numbered 15, when the start switch SW of FIG. 5 is ON, there appears a signal of low level, and when OFF, there appears a signal of high level. This signal serves as the above-described start signal. An AND gate AD2 takes the logic product of the signal appearing at the terminal numbered 15 and the shift pulse $\phi$SH fed to the terminal numbered 17 from the sensor driver DR of FIG. 5; an OR gate OR1 takes the logic sum of the power-up clear pulse PUC fed from the power-up clear circuit PCL of FIG. 5 to the terminal numbered 16 and the high level signal produced by a logic system to be described later, each time one cycle of focusing detecting operation is terminated (that is, each time the correlation detection between the above-described last image portions PAN and PBN is terminated); and an RS flip-flop FF1 is arranged to be reset by the high level signal from the OR gate OR1 and to be set by the high level signal from the AND gate AD2. The Q output of flip-flop FF1, after having taken a high level in synchronism with that of the shift pulse $\phi$SH which occurs just after the opening of the start switch SW, is changed to a low level in synchronism with the termination of one cycle of focus detecting operation. Therefore, here, it is assured by the Q output of the flip-flop FF1 that a focus detecting operation starts in synchronism with the shift pulse $\phi$SH just after the start switch SW is opened, that so long as the start switch SW is open, the focus detecting operation is recycled, and that the focus detecting operation defers pending upon the termination thereof regardless of the closure of the start switch SW. An RS flip-flop FF2 is arranged to be reset together with the flip-flop FF1 by the high level signal from the OR gate OR1 and to be set by a high level signal produced from an output terminal B of a conventional programmable logic array PLA1 each time every n picture element data from the image sensor IS of FIG. 5 have been taken in the analogue shift registers ASR1, ASR2 and ASR3. An AND gate AD3 takes the logic product of the Q output of the flip-flop FF1, the $\overline{Q}$ output of the flip-flop FF2 and the transfer clock pulse $\phi$2 fed from the sensor driver DR of FIG. 5 to the terminal numbered 18; a binary counter CNT3 of the falling edge synchronization type is arranged to count the output pulses from the AND gate AD3 and to be reset by high level signal from the OR gate OT1; and a programmable logic array PLA1 has its contents preset so as to define a timing in correspondence to the output period of effective picture element data from the image sensor IS, based on the output of said counter CNT3. In this instance, its content is programmed in a manner based on the assumption that after the application of the shift pulse $\phi$SH from the sensor driver DR to the image sensor IS, a number $\beta$ of transfer clock pulse $\phi$2 are fed until a signal from each first sensor element EA1 and EB1 is obtained, and the signal from each first sensor element EA1 and EB1 is obtained in synchronism with the $(\beta+1)$th transfer clock pulse $\phi$2. Then, during a time interval after the counter CNT3 has counted $\beta$ output pulses from the AND gate AD3, and before it counts $(\beta+1)$ output pulses, there is produced a high level signal at its output terminal A, and when $(\beta+n)$ pulses have been counted, there is produced a high level signal at its output terminal B. It is noted that the output from the output terminal B of the programmable logic array PLA1 is applied to the flip-flop FF2 at its "set" terminal S. Therefore, here, applied to the counter CNT3 after the production of those shift pulses $\phi$SH which occurred just after the start switch SW is opened, are $(\beta+n)$ transfer clock pulses $\phi$2 through the AND gate AD3. Afterwards, until the start of a new focus detecting operation, the supply of pulses is cut off. Also, the output from the output terminal B of programmable logic array PLA1 is maintained at a high level after the counted value of the counter CNT3 becomes $(\beta+n)$, until counter CNT3 is reset by the output pulse from the OR gate OR1. An OR gate OR2 takes the logic sum of the power-up clear pulse PUC from the terminal numbered 16 and the output of the terminal B of the programmable logic array PLA1; and an RS flip-flop FF3 is arranged to be reset by the high level output from the output terminal A of the programmable logic array PLA1. Here, by the Q output of flip-flop FF3, a period corresponding to the output period of the effective picture element data from the image sensor IS, that is, in other words, the period for which the picture element data from the image sensor IS are taken in the analogue shift registers ASR1 to ASR3, is defined. An AND gate AD4 takes the logic product of the Q output of flip-flop FF3 and the transfer clock pulse $\phi 2$ from the terminal numbered 18. As will be understood from the above construction and arrangement, produced from AND gate AD4 are n picture element data for each of the first and second sensed images IA and IB, that is, n $\phi 2$-synchronized pulses corresponding to the individual signals of the sensor elements EA1 to EAn, and EB1 and EBn. The output pulses from AND gate AD4, which serve as the gate control signal for the gate G2 of FIG. 5 when the picture element data from the image sensor IS are taken in the analogue shift registers ASR1 to ASR3, and which serve as the drive pulses for the analogue shift registers ASR2, ASR1 and ASR3, are routed through the respective OR gates OR3, OR4, OR5 and OR6 to appear at the terminals numbered 2, 7, 6 and 8 . Again, the output pulses of this time from the AND gate AD 4 are used as the gate control signals for the gates G1 and G4 of FIG. 5 also at the time when the picture element data are taken in. In this connection it should be pointed out that, as shown in FIG. 6, the image sensor IS produces the outputs with the lack of signals during the time when the reset pulse $\phi R$ takes a high level within the high level period of the transfer clock pulse $\phi 2$. Therefore, if the gates G1 and G4 are turned on and held in during the high level period of the transfer clock pulses $\phi 2$, there is a high possibility of imparting into the picture element data in each of the analogue shift registers ASR1 to ASR3 a noise signal resulting from substrate bias noise and the like in the image sensor IS. On the other hand, the output pulses of this time from the AND gate AD4 are equivalent to the transfer clock pulses $\phi 2$, and, therefore when the output pulses of AND gate AD4 are used of themselves as the gate control signals for the gates G1 and G4, the above-described inclusion of the noise signal is liable to occur. On this account, here, in order to dissipate the fear of allowing such noise to enter, provision is made of an inverter for obtaining an inverted signal of the reset pulse $\phi R$ fed from the sensor driver DR of FIG. 5 to the terminal numbered 19 . An AND gate AD5 takes the logic product of the output of inverter IV and the output of the AND gate AD4 to produce a pulse signal having a high level period corresponding to the period obtained by subtracting the high level period of the reset pulse $\phi R$ from the high level period of the transfer clock pulse $\phi 2$. The output pulse of AND gate AD5 is made to serve as the gate control signal for the gates G1 and G4 when reading the picture element data, and appears at the terminals numbered 1 and 4. Here, the forgoing constitutes a picture element data read-in control portion for controlling the storing of the picture element data from the image sensor IS of FIG. 5 in the analogue shift registers ASR1 to ASR3, by the control circuit CTC.

Next, an AND gate AD6 takes the logic product of the Q output of the flip-flop FF2 and the transfer clock pulse $\phi 2$ fed to the terminal numbered 18. As will be understood from the above description of the construction and arrangement, AND gate AD6 continues producing the transfer clock pulses $\phi 2$ after the picture element data from the image sensor IS have been taken in the analogue shift registers ASR1, ASR2 and ASR3, until all of the above described correlation detection is terminated, that is, until one cycle of focus detecting operation is terminated.

It is noted that the output pulses of AND gate AD6 serve as the gate control signals for the gate G5 of FIG. 5 during the correlation detection based on the stored data, and are sent out from the terminal numbered 5. They further serve as the drive pulses at this time for the analogue shift register ASR3 when routed through the OR gate OR6 to be sent out from the terminal numbered 8.

A binary down counter DCNT of the falling edge synchronization type, whose initial set value is (n-m), is arranged to be initially set by the high level output from the OR gate OR1 as is applied to the reset terminal R thereof, and to be decremented, that is to count down one by one, by the high level pulse produced from the output terminal B of a conventional, programmable logic array PLA2 each time one recirculation of the stored data of the analogue shift register ASR3 of FIG. 5 is terminated and the pulse is applied to the clock input terminal CK thereof. A binary counter CNTA of the falling edge synchronization type is arranged to count the output pulses from the AND gate AD6 and to be reset by the high level output from an OR gate OR7 which takes the logic sum of the output from the OR gate OR1 and the output from the output terminal B of the programmable logic array PLA2. A programmable logic array PLA2 defines the timing for start of recirculation shift of the stored data of the analogue shift register ASR1, advanced one bit relative to the recirculation shift of the stored data of the analogue shift register ASR3, on the basis of the count outputs of counter CNT4 and the down counter DCNT, and defines the timing of count-up of the counter CNT2. Array PLA2 produces the count down pulse of the down counter DCNT, and a signal representing the correlation between the last image portions PAN and PBN in the first and second sensed images IA and IB, that is, the last correlation detection. In this instance, the content of the programmable logic array PLA2 is previously programmed so that, first, in order to define the timing of the start of recirculation shift of the stored data of the analogue shift register ASR1 advanced every one bit relative to the recirculation shift of the stored data of the analogue shift register ASR3, and the timing of the count up of the counter CNT2, with the fact that "the counted value of the counter CNT4 =the counted value of the down counter DCNT," a high level signal is produced at its output terminal A until the counter CNT4 is reset. When the counter CNT4 advances n counts, a high level signal is produced at array output terminal B, serving as the count down pulse of the DOWN counter DCNT, and continues until the counter CNT4 advances (n+1) counts. Further, when the DOWN counter DCNT becomes "0" count, a high level signal is produced from its output terminal C, serving as a signal representing the last correlation detection and continues until down counter DCNT is reset. It is noted that the high level signal from the output terminal A of the programmable logic array PLA2, as the count up pulse for the counter CNT2 of FIG. 5, is taken out from the terminal numbered 11.

An RS flip-flop FF4 is arranged to be reset by the reset pulse for the counter CNT1 of FIG. 5 produced from an OR gate OR9, to be described more fully later and to be set by the high level signal from the output terminal A of the programmable logic array PLA2. An AND gate AD7 takes in the logic product of the Q output of flip-flop FF4 and the output of the above-described AND gate AD6. As will be understood from a logic system to be more fully described later, AND gate AD7 produces (m+1) transfer clock pulses $\phi 2$ counting from the timing of the start of recirculation shift of the stored data of the analogue shift register ASR1, defined by the high level signal from the output terminal A of the programmable logic array PLA2. A binary counter CNT5 of the falling edge synchronization type is arranged to count the output pulses from AND gate AD7 and to be reset by the reset pulse for the counter CNT1 of FIG. 5 from the OR gate OR9. A programmable logic array PLA3 has its contents previously programmed so that, on the basis of the count output of counter CNT5, the timing of termination of recirculation shift of the stored data of the analogue shift register ASR1, and the timing of subsequent one-bit rightward shift of the stored data of the analogue shift registers ASR2 and ASR1, are defined. Concretely speaking, the content is so programmed that when the content of the counter CNT5 becomes "m" counts, a high level signal is produced at array output terminal A, and this signal continues until (m+1) counts. An OR gate OR8 takes the logic sum of the power-up clear pulse PUC applied to the terminal numbered 16, and the output from the output terminal A of the programmable logic array PLA3, and RS flip-flop FF5 is arranged to be reset by a high level output from the OR gate OR8 and to be set by the high level output from the output terminal A of the programmable logic array PLA3, and an RS flip-flop FF5 is arranged to be reset by a high level output from the OR gate OR8 and to be set by the high level output from the output terminal A of the programmable logic array PLA2. By the Q output of flip-flop FF5, the period of recirculation shift of the stored data of the analogue shift register ASR1 is defined. An AND gate AD8 takes in the logic product of the Q output of flip-flop FF5 and the output of the AND gate AD6. AND gate AD8 produces m transfer clock pulses counting from the timing of the start of recirculation shift of the stored data of the analogue shift register ASR1, defined by the high level signal from the output terminal A of the programmable logic array PLA2, and they serve as the drive pulses for the recirculation shift of the stored data of the analogue shift register ASR1 when routed through the OR gate OR5 and out from the terminal numbered 6. In addition, they serve as a gate control signal for the gate C3 of FIG. 5, and as the timing pulse for the AND gate AD1 in the comparator circuit COM, being taken out from the terminals numbered 3 and 9 respectively. An AND gate AD9 takes in the logic product of the output from the output terminal A of the programmable logic array PLA3, and the output from the AND gate AD6. AND gate AD9 produces one transfer pulse φ2 after one recirculation shift of the stored data in the analogue shift register ASR1 is terminated. This serves as the gate control signal for the gate G2 to effect a one-bit rightward shift of the stored data in each of the analogue shift registers ASR2 and ASR1, and as the drive pulses for the analogue shift registers ASR2 and ASR1, when routed through respective OR gates OR3, OR4 and OR5 to be taken out from the terminals numbered 2, 7, and 6 respectively. An OR gate OR9 takes the logic sum of the power-up clear pulse PUC applied to the terminal numbered 16, and the output of the AND gate AD9. A high level signal from OR gate OR9 serves as the reset pulse for the flip-flop FF4 and counter CNT5, when applied to each of the reset terminals R thereof, and also serves as the reset pulse for the counter CNT1 of FIG. 5, being taken out from the terminal numbered 10. An AND gate AD10 takes the logic product of the output from the output terminal C of the programmable logic array PLA2 and the output of the AND gate AD9. AND gate AD10 produces one φ2-synchronized high level pulse after the correlation detection between the last image portions PAN and PBN in the first and second sensed images IA and IB, that is, after one cycle of focus detecting operation is terminated. This serves as the latch signal for the latch circuit LT3 of FIG. 5 and is taken out from the terminal numbered 13. It is noted that the OR gate OR1 is arranged to take the logic sum of the power-up clear pulse PUC applied to the terminal numbered 16 and the output of AND gate AD10, and that the output from the OR gate OR1 is of high level which is applied as the reset pulse to the flip-flops FF1 and FF2, counters CNT3 and CNT4 and the DOWN counter DCNT at their respective reset terminals R (for the counter CNT4 it is routed through the OR gate OR7 before application thereto. The output of an OR gate also applied as the reset pulse to the counter CNT2 and latch circuit LT1 of FIG. 5, being taken out from the terminals numbered 12 and 14 respectively. The foregoing constitutes a correlation detection control portion for controlling the correlation detecting operation based on the stored data of the analogue shift registers ASR1, ASR2 and ASR3, in the control circuit CTC. The correlation detection control portion and the above-described picture element data read-in control portion are combined to form the control circuit CTC.

Figure 8:
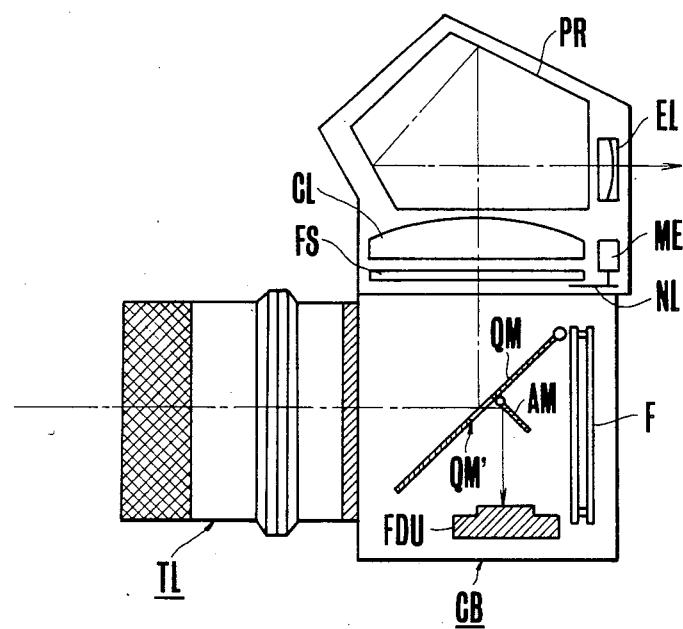
FIG. 8 is a schematic sectional view showing an example of a general arrangement of one form of an apparatus of the present invention explained in connection with FIGS. 1 to 5, as applied to a single lens reflex camera.

Now, since the focus detecting apparatus and focus adjusting apparatus of the present invention is well suited for use in single lens reflex cameras, when the apparatus of the invention is incorporated in the single lens reflex camera, which an arrangement, for example, as shown in FIG. 8 may be employed. That is, in the figure there is shown a camera body CB, a taking lens TL, a quick return mirror QM having a semi-transparent portion QM', an auxiliary mirror AN mounted on the back of the quick return mirror QM in alignment with its semi-transparent portion QM', and a focus detecting unit FDU formed with such optical arrangement as shown in FIG. 1 and such circuit as shown in FIG. 5 for the start switch SW and meter ME) and arranged with the plane of the lenslet group, explained in connection with FIG. 1, almost conjugate to the film plane F so that an image bearing beam from the auxiliary mirror AM impinges thereon. Also shown is a focusing screen FS, a condenser lens CL, a pentaprism PR, and an eye-piece EL. The meter ME is arranged as shown in the figure, so that the deflection of the needle NL can be observed in the field of view of the finder.

In the embodiment illustrated above, the output of the D/A converter DAC is fed to the meter ME. The deflected position of the needle NL with reference to the point "a" indicates either the in-focus condition, or the near focus condition, or the far focus condition of the image forming lens LS relative to the object.

Next, a number of other examples of this discrimination of the various focusing conditions, namely, in-focus, near focus and far focus condition, with their indications, will be described below.

Figure 9A:
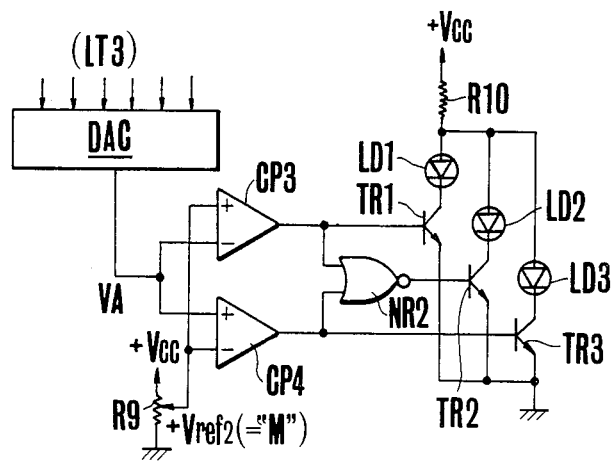
Figure 9B:
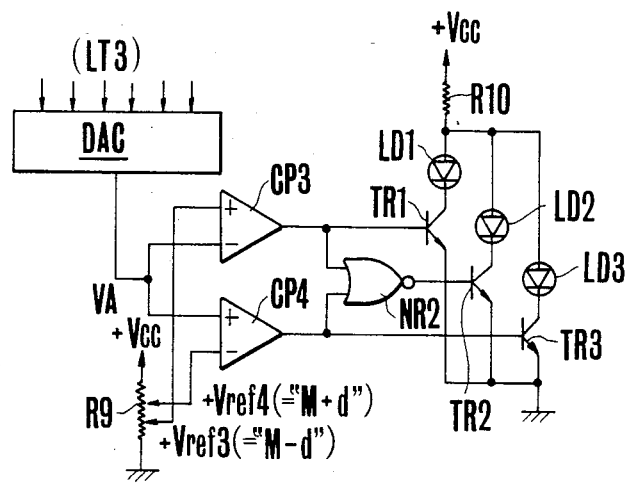

Referring first to FIGS. 9A and 9B, there are shown two examples of indication control circuits where the outputs of the D/A converter DAC is compared with a predetermined reference voltage to obtain three signals representing the in-focus, near focus and far focus conditions. These signals selectively drive three indicator elements so that one of the in-focus, near focus and far focus conditions is indicated at any one time. In the example of FIG. 9A, on the basis of the fact described in connection with FIG. 4, the detection of NC =M for the optimum correlation determines the in-focus condition, the detection of NC<M for that correlation determines the near focus condition, and the detection of NC>M for that correlation determines the far focus. That is, in the figures, an analogue comparator P3 receptive at its inversion input of the output VA of the D/A comparator DAC and at its non-inversion input of a reference voltage +Vref.2, produces a high level signal when VA<+Vref.2, and a low level signal when VA≧+Vref.2. An analogue comparator CP4 receptive at its non-inversion input conversely of the output VA of the D/A converter DAC, and at its inversion input of the reference voltage +Vref.2, produces a high level signal when VA≧=+Vref.2 and a low level signal when VA>+Vref.2. A NOR gate NR2 is connected to take the inverted logic product of the output of said comparators CP3 and CP4 and to produce a high level signal only when the outputs of both comparators CP3 and CP4 are of low levels simultaneously (that is, this represents VA = +Vref.2). NPN switching transistors TR1, TR2 and TR3 are connected to be rendered conducting by the high level outputs from the comparator CP3, NOR gate, NR2 and comparator CP4, respectively. Light-emitting diodes LD1, LD2, and LD3 act as indicator elements for indicating the near focus, in-focus and far focus conditions, respectively, as they are lighted when the transistors TR1 to TR3 become conducting, respectively. A protection resistor R10 is provided for the indicated elements. With such circuit, when the reference voltage, as the standard position datum, set in a resistor R9 is made equal to the output voltage of the D/A converter DAC which occurs when the output of the latch circuit LT3 of FIG. 5 is "M", that is, NC =M (in other words, that output voltage of the D/A converter DAC which corresponds to the digital datum representing the position of an array of m sensor elements corresponding to the central image portion PAM or PBM in the first and second sensed images within the arrangement of the sensor elements EA1 to EAn, or EB1 to EBn), the occurrence of the optimum correlation in NC<M, at any image portion, that is, between the image portions PA1 and PA(M−1), or PB1 and PB(M−1) in FIG. 4, causes only the output of the comparator CP3 to take high level. Alternately, the occurrence of the optimum correlation in NC M, any image portion, that is, between the image portions PA(M+1) and PAN, and between the image portions PB(M+1) and PBN causes only the output of the comparator CP4 to take high level. The detection of the optimum correlation at NC =M, that is, between the central image portions PAM and PBM causes only the output of the NOR gate NR2 to take a high level. Thus, depending upon the high level outputs from the comparators CP3 and CP4 and NOR gate NR2, when the optimum correlation occurs at NC<M, the focusing condition in question is discriminated to be in near focus, when the optimum correlation occurs at NC>M, it is discriminated to be in far focus, and when the optimum correlation occurs at NC =M, it is discriminated to be in-focus. Therefore, the light-emitting diode LD1, when lighted on, indicates the near focus condition, the light-emitting diode LD3 when lighted on indicated the far focus condition, and the light-emitting diod LD2 when lighted on indicates the in-focus condition.

Alternatively, the example shown in FIG. 9B does not present the indication of the in-focus condition only when the optimum correlation occurs at NC =M, but, as has been explained in connection with FIG. 4, sets forth a definition of a sharp focus in terms of a range of some width. Thus, when the optimum correlation occurs in a range of M−α<NC<M+α, the focusing condition in question is considered to be the in-focus one, when in NC>M−α, to be the near focus one, and when in NC M+, to be the far focus one. Here, as shown in FIG. 9B, applied to the comparator CP3, instead of the reference voltage +Vref.2, is a somewhat lower voltage than this, that is, concretely speaking, a voltage corresponding to that output voltage of the D/A converter DAC which occurs when the output of the latch circuit LT3 is "M−α" as a reference voltage +Vref.3 representing a first standard position datum. Also, applied to the comparator CP4, instead of the reference voltage +Vref.2, is a slightly higher voltage than this, that is, concretely speaking, a voltage corresponding to that output voltage of the D/A converter DAC which occurs when the output of the latch circuit LT3 is "M+α", as a reference voltage +Vref. 4 representing a second standard position datum (where +Vref. 3 <+Vref.2<+Vref.4). Therefore, when VA <+Vref.3, only the output of the comparator CP3 takes a high level. When VA >+Vref.4, only the output of the comparator CP4 takes a high level. And, when +Vref.3≦VA≦+Vref.4, only the output of the NOR gate NR2 takes a high level. Thus, depending upon the high level outputs from the comparators CP3, and CP4 and the NOR gate NR2, when the optimum correlation occurs at NC<M−α, the focusing condition in question is regarded as the near focus one, when at NC>M+α, as the far focus one, and when in a range of M−α≦NC<M+α, as the in-focus one, so that the light-emitting diodes LD1 to LD3 are selectively lighted on, depending upon the focusing condition. It is noted that as has been explained in connection with FIG. 4, the above-described parameter α must be taken at a value on the basis of the number of sensor elements EA1 to EAn, or EB1 to EBn in each group in the image sensor IS, that is, by taking into account the size of the picture element for the base of correlation and the depth of field of the image forming lens IS, such that the resultant in-focus condition is found to be always acceptable.

Next, an explanation is given of two examples of other indicator control circuits where the output of the latch circuit LT3 in the form of digital data, without being subjected to D/A conversion, is compared with a predetermined reference datum to obtain signals depending upon the in-focus, near focus and far focus conditions. Also, these signals are selectively used in driving either one of the three indicator elements, so that the detection of the in-focus, near focus conditions is indicated.

First, with the example of FIG. 10A, as is similar to the example of FIG. 9A, the occurrence of the optimum correlation at NC=M is regarded as the detection of the in-focus condition. The occurrence of the optimum correlation at NC<M is regarded as the detection of the near focus condition, and the occurrence of the optimum correlation at NC>M is regarded as the detection of the far focus condition. That is, in the figure, a fixed data output circuit DSC1 such as a switch register has its content preset so that the numerical data "M" as the standard position data is produced in binary digital form. A digital computer circuit DOC is receptive at its input X of the output data of the latch circuit LT3, and at its input Y of the output data of the fixed data output circuit DSC1. Upon discrimination of which of the inputs X and Y is larger than the other, a high level signal is produced at its output terminal A when $X<Y$, at its output terminal B when $X=Y$, and at its output terminal C when $X>Y$. The above-described transistors TR1, TR2, and TR3 responsive to the respective high level signals from the output terminals A, B, and C of the digital computer circuit DOC are rendered conducting. With such circuit, depending upon the high level output from the output terminal A, B, and C of the digital computer circuit DOC, when the optimum correlation occurs at $NC<M$, the focusing condition in question is regarded as the near focus one, when the optimum correlation occurs at $NC=M$, as the in-focus one, and when the optimum correlation occurs at $NC>M$, as the far focus one. The light-emitting diodes LD1, LD2 and LD3 are thereby selectively lighted, depending upon the focusing condition detected.

Alternatively, with the example of FIG. 10B, as is similar to the example of FIG. 9B, when the optimum correlation occurs in a range of $M-\alpha \leq NC \leq M+\alpha$, the focusing condition in question is regarded as the in-focus one, when the optimum correlation occurs at $NC<M-\alpha$, as the near focus one, and when the optimum correlation occurs at $NC>M+\alpha$, as the far focus one. That is, in the figure, a fixed data output circuit DSC2 has its content previously set so that the numerical datum "$M-\alpha$" representing a first standard position datum is produced in the binary digital form. A digital comparator DCP1 receptive at its input X of the output of the latch circuit LT3, and at its input Y of the output of fixed data output circuit DSC2, compares these two inputs X and Y with each other to produce a high level signal at its output terminal A only when $X<Y$, that is, the output of the latch circuit LT3 is smaller than "$M-\alpha$". A fixed data output circuit DSC3 has its content set so that the number datum "$M+\alpha$" representing a second standard position datum is produced in binary digital form. A digital comparator DCP2 receptive at its input X of the output of the latch circuit LT3, and at its input Y of the output of fixed data output circuit DSC3, compares these two inputs X and Y with each other to produce a high level signal at its output terminal A only when the $X>Y$, that is, the output of the latch circuit LT3 is larger than "$M+\alpha$". The above-described transistor TR1, responsive to the high level output from the output terminal A of the digital comparator DCP1, the transistor TR3 responsive to the high level output from the output terminal A of the digital comparator DCP2, and the transistor TR2 responsive to the high level output of the NOR gate NR2 which occurs only when the outputs from the both output terminals A of the digital comparators DCP1 and DCP2 are of low levels as these outputs are taken for their inverted logic product, are thus selectively rendered conducting. With such circuit, when the output of the latch circuit LT3 is smaller than $M-\alpha$, only the output of the digital comparator DCP1 is at a high. When the output of the latch circuit LT3 is larger than $M+\alpha$, only the output of the digital comparator DCP2 is at a high level, and when $M-\alpha \leq$ the output of latch circuit LT3 $\leq M+\alpha$, only the output of the NOR gate NR2 is at a high level. Thus, depending upon the high level outputs from the digital comparators DCP1 and DCP2 and the NOR gate NR2, when the optimum correlation occurs at $NC<M-\alpha$, the focusing condition in question is regarded as the near focus one, when the optimum correlation occurs in a range of $M-\alpha \leq NC \leq M+\alpha$, as the in-focus one, and when the optimum correlation occurs at $NC>M+\alpha$, as the far focus one. Accordingly, the light-emitting diodes LD1, LD2 and LD3 are selectively lighted on depending upon the focusing condition detected.

Figure 11:
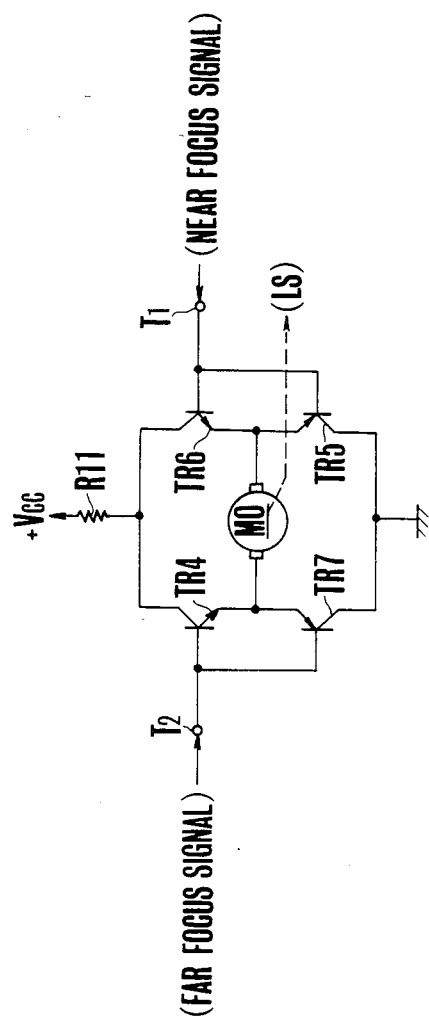
FIG. 11 is a partial circuit diagram showing an example of an automatic focus adjusting apparatus employing the circuit of FIGS. 9A, 9B, 10A and 10B.

It should be pointed out that since the examples of construction of the indicator control circuits provide the near focus signal, and the far focus signal, in the form of separate logic signals from each other, they are very suited for use in automatically adjusting the position of the image forming lens LS for focusing on an object by utilizing these signals. In conclusion, therefore, an example of automatic focus adjustment will next be described below by reference to FIG. 11. In the figure, switching transistors TR4, TR5 and TR6, TR7 are complementarily connected to each other. The collectors of npn transistors TR4 and TR6 are connected through a protection resistor R11 to the positive terminal of a battery (not shown), and the collectors of the pnp transistors TR5 and TR7 are connected to the ground. Applied to the base of the transistors TR6 and TR5 is the near focus signal, through an input terminal T1 (as the near focus signal use may be made of the high level output of the comparator CP3 in FIGS. 9A and 9B, or the high level output from the output terminal A of the digital computer circuit DOC in FIG. 10A, or the high level output from the digital comparator DCP1 in FIG. 10B). Also, applied to the bases of the transistor TR4 and TR7 is the far focus signal, through an input terminal T2 (as the far focus signal use may be made of the high level output of the comparator CP4 in FIGS. 9A and 9B, or the high level output from the output terminal C of the digital computer circuit DOC in FIG. 10A, or the high level output of the digital comparator DCP2 in FIG. 10B). A lens drive motor MO is inserted between a connection point between the emitters of the transistors TR4 and TR7, and a connection point between the emitters of the transistors TR5 and TR6. With such circuit, now assuming that the image forming lens LS is in the near focus condition, then the input for the terminal T1 is high and the input for the terminal T2 is low, so that the transistors TR6 and TR7 only are rendered conducting. The motor MO is thereby energized to rotate, for example, in a forward direction. Alternatively, assuming that when in the far focus condition the input for the terminal T2 is high and the input for the terminal T1 is low, so that the transistor TR4 and TR5 only are rendered conducting, then the motor MO is rotated in the reverse direction. Then, when the in-focus condition is attained, the transistors TR4 and TR6 are rendered non-conducting, so that the motor MO is stopped from further rotation. Therefore, the forward rotation of the motor MO causes backward axial movement of the image forming lens LS, and the reversed rotation causes the forward movement of the lens LS. An appropriate control mechanism is provided between the output shaft of motor MO, and the distance adjusting ring of the mounting for the lens, to form an autofocus apparatus for image forming lens LS.

As has been described in great detail, according to the present invention, by obtaining the correlation with a minute picture element of the image as a base, there is detected the mutual positional relationship between the two images of the same object, formed with two light beams from the image forming optical system at the two prescribed exit pupil areas lying almost symmetrical to each other with respect to the optical axis of the optical system, to thereby detect whether or not the image forming optical system is in-or-out of focus for that object. Such a unique method makes it possible to always carry out focus detection with higher accuracy. Particularly in application to single lens reflex cameras, a great advantage can be expected from the employment of thus method in the TTL type focus detecting and/or focus adjusting apparatus. Further, in the present invention, as has been suggested in the embodiments thereof, not only when the in-focus condition is attained, but also in the case of defocus, the direction in which the optical system was taken out of sharp focus, that is, the discrimination of the near and far focus conditions can be made with ease. Therefore, the invention is very advantageous in carrying out an indication of the focus condition or an automatic focus adjustment.

What is claimed is:

1. A method for detecting a focusing condition of an image forming optical system which can adjust its focal point relative to an object, said method comprising the steps of:

(A) forming first and second data concerning respective first and second detection images of said object, said first and second detection images being obtained through a pair of portions of said optical system almost symmetrical with respect to the optical axis and having associated image portions relating to said object, said associated image portions shifting symmetrically with each other utilizing as a reference the position of said associated image portions when said optical system is in an in-focus position relative to said object, wherein the direction of the shift and amount of the shift indicate the direction of deviation and the amount of deviation from the in-focus position of said optical system, and said first data and second data have associated data portions relating to said associated image portions, and further said associated data portions also shifting symmetrically with each other according to the shift of said associated image portions using as a reference the position of said associated data portions when said optical system is in an in-focus position, and the shifting positions of said associated data portions reach positions to secure an optimum correlation between said first data and second data;

(B) forming a pair of data portions by sampling a data portion from respective ones of said first and second data and at the same time varying sampling ranges by sampling said pair of data portions for each one of said first data and second data, then forming said pair of data portions from said first data and second data for every variation in said sampling ranges, while on the other hand, the sampling ranges are varied to correspond to the above-mentioned way of varying the associated data portions, that is, the sampling ranges of said first data and second data are varied symmetrically with each other yet concurrently, using as the reference such sampling ranges in which an optimum correlation can be obtained when said optical system is in an in-focus position;

(C) seeking a correlation between the data portions on each pair of the data portions; and (D) detecting the shift state of said associated data portion by a shift state from the sampling ranges mentioned above as the reference of the sampling ranges in which the pair of data portions having the optimum correlation out of said correlations can be obtained, then detecting the focusing condition of said optical system based on the same.

2. A method according to claim 1, further comprising a step for adjusting said optical system into an in-focus position based on the detection result of the focusing condition of said optical system.

3. An apparatus for detecting a focusing condition of an image forming optical system which can adjust its focal point relative to an object, comprising:

(A) control means;

(B) light receiving means controlled by said control means for forming first and second data concerning first and second detection images of said object, respectively, said first and second detection images being obtained through a pair of portions of said optical system almost symmetrical with respect to the optical axis and having associated image portions relative to the object, said associated image portions shifting symmetrically with each other according to the focusing condition of said optical system using as the reference the position of said associated image portions at a time when said optical system is in an in-focus position relative to the object with the direction of shift and amount of shift indicating the direction of deviation and the amount of deviation of said optical system from the in-focus position, said first data and second data having associated data portions relative to said associated image portions, wherein said associated data portions also shift symmetrically with each other according to the shift of said associated image portions using as the reference the position of said associated data portions when said optical system is in an in-focus position, and the shifting positions of said associated data portions form the positions at which said data portions have an optimum correlation between the first data and the second data;

(C) sampling means controlled by said control means for forming a pair of data portions by sampling respective data portions from the first data and the second data being produced by said light receiving means and at the same time varying sampling ranges in sampling said pair of data portions with regard to each of one of the first data and the second data, then forming said pair of data portions from the first data and the second data for every variation of said sampling ranges, said sampling means varying said sampling ranges in a manner corresponding to the manner of shifting of said associated data portions, that is, varying the sampling ranges of the first data and the second data symmetrically with each other yet concurrently, using as the reference the sampling ranges at which a pair of data portions can be obtained that secure an optimum correlation therebetween when said optical system is in an in-focus position;

(D) correlation detecting means controlled by said control means for seeking a correlation between the data portions in each pair of data portions mentioned above as being formed by the sampling means; and (E) means for detecting the focusing condition being controlled by said control means for detecting the shifting state of said associated data portion of the above-mentioned sampling ranges which can obtain the pair of data portions having the optimum correlation of the correlations obtained by said correlation detecting means from said sampling ranges constituting the reference, thus detecting the focusing condition of the optical system based on the same.

4. An apparatus according to claim 3, further comprising focus adjusting means for adjusting said optical system to an in-focus position corresponding to an output of said means for detecting the focusing condition.

5. An automatic focus detection device for a single lens reflex camera which can have various taking lenses with adjustable focus points mounted thereon, comprising:

(A) control means;

(B) light receiving means controlled by said control means for forming first and second data concerning respective first and second detection images of an object, said first and second detection images being obtained through a pair of portions of a mounted taking lens almost symmetrical with respect to the optical axis and having associated image portions relative to said object, said associated image portions shifting symmetrically with each other according to the focusing condition of the mounted taking lens, using as the reference the position of said associated image portions at a time when said mounted taking lens is in an in-focus position relative to the object, wherein the direction of said shift and the amount of the shift indicates the direction of deviation and amount of deviation of said mounted taking lens from the in-focus position, and the first data and the second data have associated data portions relating to said associated image portions, while said associated data portions also shift with each other according to the shifting of the associated image portions using as the reference the position of said associated data portions when the mounted taking lens is in the in-focus condition, and the shifting position of said associated data portions forms a position at which data portions that secure the optimum correlation between the first data and the second data is located;

(C) sampling means controlled by said control means for forming a pair of data portions by sampling data portions from each one of the first data and the second data being produced by the light receiving means and at the same time varying sampling ranges from sampling said pair of data portions for each one of the first data and the second data then forming said pair of data portions from the first data and the second data for every variation of said sampling ranges, said sampling means varying the sampling ranges in a manner corresponding to the manner of shifting of the associated data portions, that is, varying the sampling ranges of the first data and the second data symmetrically with each other yet concurrently, using as the reference the sampling ranges at which a pair of data portions that secure an optimum correlation therebetween can be obtained when the mounted taking lens is in an in-focus position;

(D) correlation detecting means being controlled by said control means for seeking a correlation between the data portions in each one of the pair of the data portions formed by said sampling means; and (E) means for detecting the focusing condition being controlled by said control means for detecting the shifting state of said associated data portions by shifting states from the sampling ranges constituting the reference of the sampling ranges which can secure the pair of data portions having the optimum correlation from the correlations obtained by said correlation detecting means, then detecting the focusing condition of the mounted taking lens based on the same.

6. An apparatus for detecting a focusing condition of an image forming optical system which can adjust its focal point relative to an object, comprising:

(A) control means;

(B) light receiving means controlled by said control means for forming first and second data concerning first and second detecting images of said object, respectively, said first and second detection images being obtained through a pair of portions of said optical system almost symmetrical with respect to the optical axis and having substantially same image portions relative to the object, said substantially same image portions shifting symmetrically with each other according to the focusing condition of said optical system from the position of said substantially same image portions at a time when said optical system is in an in-focus position relative to the object with the direction of shift and amount of shift indicating the direction of deviation and the amount of deviation of said optical system from the in-focus position, and the shifting position of said substantially same image portions is a position at which an optimum correlation is obtained;

(C) sampling means controlled by said control means for forming pair of data portions by sampling respective data portions from the first data and the second data being produced by said light receiving means and varying sampling ranges with regard to each of one of the first data and the second data, thereby forming said pair of data portions from the first data and the second data for every variation of said sampling ranges, said sampling means varying said sampling ranges symmetrically with each other yet concurrently, using as a reference the position at which an optimum correlation is obtained when the optical system is in an in-focus position;

(D) operation means controlled by said control means for operating amounts varying depending on the degree of similarity, each pair of data portions mentioned above as being formed by the sampling means; and (E) detection means for detecting a position at which said optimum correlation is obtained on the basis of the outputs of the operation means, said detection means determining the direction of shift and the amount of shift with respect to the standard position of similar range portions to detect the focusing condition of the optical system.

7. An apparatus for detecting a focusing condition of a variable-focus image forming optical system movable from an unfocused condition to a condition focused on an object, comprising:

light receiving means for forming first and second data concerning first and second images of the object, said light receiving means having a plurality of first sections for forming a plurality of first data portions and having a plurality of second sections for forming a plurality of second data portions, and arranged so that the first and second data portions assume a shifted state relative to each other when the optical system is in an unfocused condition, the first data portion and the second data portions being otherwise shiftable relative to each other, the first data portions having corresponding second data portions in each shifted state of the first and second data portions;

processing means for forming a first sampling range composed of a plurality of first data portions and a second sampling range composed of a plurality of second data portions and for simultaneously and successively varying the first and second sampling ranges relative to each other by changing the plurality of first and second data portions, and successively correlating a plurality of first data portions with a plurality of second data portions to determine an optimum correlation, and focus detecting means for detecting deviation of the optimum correlation from a correlation representing the focused condition of the optical system.

8. A method for detecting a focusing condition of an image forming optical system which can adjust its focal point relative to an object, said method comprising the steps of:

(A) forming first and second data concerning respective first and second detection images of said object, said first and second detection images being obtained through a pair of portions of said optical system almost symmetrical with respect to the optical axis and having associated image portions relating to said object, said associated image portions shifting symmetrically with each other utilizing as a reference the position of said associated image portions when said optical system is in an in-focus position relative to said object, wherein the direction of the shift and amount of the shift indicate the direction of deviation and the amount of deviation from the in-focus position of said optical system, and said first data and second data have associated data portions relating to said associated image portions, and further said associated data portions also shifting symmetrically with each other according to the shift of said associated image portions using as a reference the position of said associated data portions when said optical system is in an in-focus position, and the shifting positions of said associated data portions reach positions to secure an optimum correlation between said first data and second data;

(B) forming a pair of data portions by sampling a data portion from respective ones of said first and second data and at the same time varying sampling ranges by sampling said pair of data portions for each one of said first data and second data, then forming said pair of data portions from said first data and second data for every variation in said sampling ranges, while on the other hand, the sampling ranges are varied to correspond to the above-mentioned way of varying the associated data portions, that is, the sampling ranges of said first data and second data are varied symmetrically with each other yet concurrently, using as the reference such sampling ranges in which an optimum correlation can be obtained when said optical system is in an in-focus position;

(C) seeking a correlation between the data portions on each pair of the data portions; and (D) detecting the variation of sampling ranges in which the pair of data portions having the optimum correlation out of said correlations can be obtained from the sampling ranges mentioned above as the reference, then detecting the focusing condition of said optical system based on the same.

9. An apparatus for detecting a focusing condition of an image forming optical system which can adjust its focal point relative to an object, comprising:

(A) control means;

(B) light receiving means controlled by said control means for forming first and second data concerning first and second detection images of said object, respectively, said first and second detection images being obtained through a pair of portions of said optical system almost symmetrical with respect to the optical axis and having associated image portions relative to the object, said associated image portions shifting symmetrically with each other according to the focusing condition of said optical system using as the reference the position of said associated image portions at a time when said optical system is in an in-focus position relative to the object with the direction of shift and amount of shift indicating the direction of deviation and the amount of deviation of said optical system from the in-focus position, said first data and second data having associated data portions relative to said associated image portions, wherein said associated data portions also shift symmetrically with each other according to the shift of said associated image portions using as the reference the position of said associated data portions when said optical system is in an in-focus position, and the shifting positions of said associated data portions form the positions at which said data portions have an optimum correlation between the first data and the second data;

(C) sampling means controlled by said control means for forming a pair of data portions by sampling respective data portions from the first data and the second data being produced by said light receiving means and at the same time varying sampling ranges in sampling said pair of data portions with regard to each of one of the first data and the second data, then forming said pair of data portions from the first data and the second data for every variation of said sampling ranges, said sampling means varying said sampling ranges in a manner corresponding to the manner of shifting of said associated data portions, that is, varying the sampling ranges of the first data and the second data symmetrically with each other yet concurrently, using as the reference the sampling ranges at which a pair of data portions can be obtained that secure an optimum correlation therebetween when said optical system is in an in-focus position;

(D) correlation detecting means controlled by said control means for seeking a correlation between the data portions in each pair of data portions mentioned above as being formed by the sampling means; and (E) means for detecting the focusing condition being controlled by said control means for detecting the variation of the above-mentioned sampling ranges which can obtain the pair of data portions having the optimum correlation of the correlations obtained by said correlation detecting means from said sampling ranges constituting the reference, thus detecting the focusing condition of the optical system based on the same.

10. An automatic focus detection device for a single lens reflex camera which can have various taking lenses with adjustable focus points mounted thereon, comprising:

(A) control means;
(B) light receiving means controlled by said control means for forming first and second data concerning respective first and second detection images of an object, said first and second detection images being obtained through a pair of portions of a mounted taking lens almost symmetrical with respect to the optical axis and having associated image portions relative to said object, said associated image portions shifting symmetrically with each other according to the focusing condition of the mounted taking lens, using as the reference the position of said associated image portions at a time when said mounted taking lens is in an in-focus position relative to the object, wherein the direction of said shift and the amount of the shift indicates the direction of deviation and amount of deviation of said mounted taking lens from the in-focus position, and the first data and the second data have associated data portions relating to said associated image portions, while said associated data portions also shift with each other according to the shifting of the associated image portions using as the reference the position of said associated data portions when the mounted taking lens is in the in-focus condition, and the shifting position of said associated data portions forms a position at which data portions that secure the optimum correlation between the first data and the second data is located;
(C) sampling means controlled by said control means for forming a pair of data portions by sampling data portions from each one of the first data and the second data being produced by the light receiving means and at the same time varying sampling ranges from sampling said pair of data portions for each one of the first data and the second data then forming said pair of data portions from the first data and the second data for every variation of said sampling ranges, said sampling means varying the sampling ranges in a manner corresponding to the manner of shifting of the associated data portions, that is, varying the sampling ranges of the first data and the second data symmetrically with each other yet concurrently, using as the reference the sampling ranges at which a pair of data portions that secure an optimum correlation therebetween can be obtained when the mounted taking lens is in an in-focus position;
(D) correlation detecting means being controlled by said control means for seeking a correlation between the data portions in each one of the pair of the data portions formed by said sampling means; and
(E) means for detecting the focusing condition being controlled by said control means for detecting the variation of the sampling ranges which can secure the pair of data portions having the optimum correlation from the correlations obtained by said correlation detecting means from the sampling ranges constituting the reference, then detecting the focusing condition of the mounted taking lens based on the same.

11. An apparatus for detecting a focusing condition of an image forming optical system which can adjust its focal point relative to an object, comprising:

(A) control means;
(B) light receiving means controlled by said control means for forming first and second data concerning first and second detecting images of said object, respectively, said first and second detection images being obtained through a pair of portions of said optical system almost symmetrical with respect to the optical axis and having substantially same image portions relative to the object, said substantially same image portions varying symmetrically with each other according to the focusing condition of said optical system from the position of said substantially same image portions at a time when said optical system is in an in-focus position relative to the object with the direction of the variation and the amount of the variation indicating the direction of deviation and the amount of deviation of said optical system from the in-focus position, and the varying position of said substantially same image portions is a position at which an optimum correlation is obtained;
(C) sampling means controlled by said control means for forming pair of data portions by sampling respective data portions from the first data and the second data being produced by said light receiving means and varying sampling ranges with regard to each of one of the first data and the second data, thereby forming said pair of data portions from the first data and the second data for every variation of said sampling ranges, said sampling means varying said sampling ranges with regard to each one of said first data and second data concurrently;
(D) operation means controlled by said control means for operating amounts varying depending on the degree of similarity of each pair of data portions mentioned above as being formed by the sampling means; and
(E) detection means for detecting a position at which said optimum correlation is obtained on the basis of the outputs of the operation means, said detection means determining the direction of the variation and the amount of the variation of said substantially the same image portion from the standard position to detect the focusing condition of the optical system.

12. An apparatus for detecting a focusing condition of an image forming optical system movable from an unfocused condition to a condition focused on an object, comprising:

light receiving means for forming first and second data concerning first and second images of the object, said light receiving means having a plurality of first sections for forming a plurality of first data portions and having a plurality of second sections for forming a plurality of second data portions, and arranged so that the first and second data portions assume a varied state relative to each other when the optical system is in an unfocused condition, the first data portion and the second data portions being otherwise variable relative to each other, the first data portions having corresponding second data portions in each varied state of the first and second data portions;

processing means for forming a first sampling range composed of a plurality of first data portions and a second sampling range composed of a plurality of second data portions and for simultaneously varying the first and second sampling ranges relative to each other by changing the plurality of first and second data portions, and successively correlating a plurality of first data portions with a plurality of second data portions to determine the position of an optimum correlation, and focus detecting means for detecting deviation of the position of the optimum correlation from the position which is obtained a correlation representing the focused condition of the optical system.

13. A method for detecting a focusing condition of an image forming optical system which can adjust its focal point relative to an object, said method comprising the steps of:

(A) forming first and second data concerning respective first and second detection images of said object, said first and second detection images being obtained through a pair of portions of said optical system almost symmetrical with respect to the optical axis and having associated image portions relative to said object, said associated image portions varying symmetrically with each other utilizing as a reference the position of said associated image portions when said optical system is in an in-focus position relative to said object, wherein the direction of the variation and amount of the variation indicate the direction of deviation and the amount of deviation from the in-focus position of said optical system, and said first data and second data have associated data portions relating to said associated image portions, and further said associated data portions also varying symmetrically with each other according to the variation of said associated image portions using as a reference the position of said associated data portions when said optical system is in an in-focus position, and the varying positions of said associated data portions reach positions to secure an optimum correlation between said first data and second data;

(B) forming a pair of data portions by sampling a data portion from respective ones of said first and second data and at the same time varying sampling ranges by sampling said pair of data portions for each one of said first data and second data, then forming said pair of data portions from said first data and second data for every variation in said sampling ranges, while on the other hand, the sampling ranges are varied to correspond to the above-mentioned way of varying the associated data portions, that is, the sampling ranges of said first data and second data are varied symmetrically and concurrently with regard to each one of said first data and second data about a standard reference position at which an optimum correlation is obtained when said optical system is in an in-focus position;

(C) seeking a correlation between the data portions on each pair of the data portions; and (D) detecting the variation of sampling ranges in which the pair of data portions having the optimum correlation out of said correlations can be obtained from the sampling ranges mentioned above as the reference, then detecting the focusing condition of said optical system based on the same.

14. An apparatus for detecting a focusing condition of an image forming optical system which can adjust its focal point relative to an object, comprising:

(A) control means;

(B) light receiving means controlled by said control means for forming first and second data concerning first and second detection images of said object, respectively, said first and second detection images being obtained through a pair of portions of said optical system almost symmetrical with respect to the optical axis and having associated image portions relative to the object, said associated image portions varying symmetrically with each other according to the focusing condition of said optical system using as the reference the position of said associated image portions at a time when said optical system is in an in-focus position relative to the object with the direction of the variation and amount of the variation indicating the direction of deviation and the amount of deviation of said optical system from the in-focus position, said first data and second data having associated data portions relative to said associated image portions, wherein said associated data portions also vary symmetrically with each other according to the variation of said associated image portions using as the reference the position of said associated data portions when said optical system is in an in-focus position, and the varying positions of said associated data portions form the positions at which said data portions have an optimum correlation between the first data and the second data;

(C) sampling means controlled by said control means for forming a pair of data portions by sampling respective data portions from the first data and the second data being produced by said light receiving means and at the same time varying sampling ranges in sampling said pair of data portions with regard to each of one of the first data and the second data, then forming said pair of data portions from the first data and the second data for every variation of said sampling ranges, said sampling means varying said sampling ranges in a manner corresponding to the manner of varying of said associated data portions, that is, varying the sampling ranges of the first data and the second data with regard to each one of said first data and second data concurrently;

(D) correlation detecting means controlled by said control means for seeking a correlation between the data portions in each pair of data portions mentioned above as being formed by the sampling means; and (E) means for detecting the focusing condition being controlled by said control means for detecting the variation of the above-mentioned sampling ranges which a pair of data portions secure the optimum correlation of the correlations obtained by said correlation detecting means from said reference sampling range, thus detecting the focusing condition of the optical system based on the same.

15. An apparatus as in claim 14, wherein said sampling means varies said sampling ranges symmetrically about a standard position at which an optimum correlation is obtained when the optical system is in an in-focus position.

16. An automatic focus detection device for a single lens reflex camera which can have various taking lenses with adjustable focus points mounted thereon, comprising:

(A) control means;

(B) light receiving means controlled by said control means for forming first and second data concerning respective first and second detection images of an object, said first and second detection images being obtained through a pair of portions of a mounted taking lens almost symmetrical with respect to the optical axis and having associated image portions relative to said object, said associated image portions varying symmetrically with each other according to the focusing condition of the mounted taking lens, using as the reference the position of said associated image portions at a time when said mounted taking lens is in an in-focus position relative to the object, wherein the direction of said variation and the amount of the variation indicates the direction of deviation and amount of deviation of said mounted taking lens from the in-focus position, and the first data and the second data have associated data portions relating to said associated image portions, while said associated data portions also vary with each other according to the varying of the associated image portions using as the reference the position of said associated data portions when the mounted taking lens is in the in-focus condition, and the varying position of said associated data portions forms a position at which data portions that secure the optimum correlation between the first data and the second data is located;

(C) sampling means controlled by said control means for forming a pair of data portions by sampling data portions from each one of the first data and the second data being produced by the light receiving means and at the same time varying sampling ranges from sampling said pair of data portions for each one of the first data and the second data then forming said pair of data portions from the first data and the second data for every variation of said sampling ranges, said sampling means varying the sampling ranges in a manner corresponding to the manner of varying of the associated data portions, that is, varying the sampling ranges of the first data and the second data concurrently with regard to each one of said first data and second data;

(D) correlation detecting means being controlled by said control means for seeking a correlation between the data portions in each one of the pair of the data portions formed by said sampling means; and (E) means for detecting the focusing condition being controlled by said control means for detecting the variation of the sampling ranges which can secure the pair of data portions having the optimum correlation from the correlations obtained by said correlation detecting means from the sampling ranges constituting the reference, then detecting the focusing condition of the mounted taking lens based on the same.

17. An apparatus as in claim 16, wherein said sampling means varies said sampling ranges symmetrically about a standard position at which an optimum correlation is obtained when the optical system is in an in-focus position.

18. An apparatus for detecting a focusing condition of an image forming optical system which can adjust its focal point relative to an object, comprising:

(A) control means;

(B) light receiving means controlled by said control means for forming first and second data concerning first and second detecting images of said object, respectively, said first and second detection images being obtained through a pair of portions of said optical system almost symmetrical with respect to the optical axis and having substantially same image portions relative to the object, said substantially same image portions varying symmetrically with each other according to the focusing condition of said optical system from a standard reference portion which is the position of said substantially same image portions at a time when said optical system is in an in-focus position relative to the object, with the direction of the variation and amount of the variation indicating the direction of deviation and the amount of deviation of said optical system from the in-focus position;

(C) sampling means controlled by siad control means for forming pair of data portions by sampling respective data portions from the first data and the second data being produced by said light receiving means and varying sampling ranges with regard to each of one of the first data and the second data, thereby forming said pair of data portions from the first data and the second data for every variation of said sampling ranges, said sampling means varying said sampling ranges concurrently with regard to each one of said first data and second data;

(D) operation means controlled by said control means for operating amounts varying depending on the degree of similarity of each pair of data portions mentioned above as formed by the sampling means; and (E) detection means for determining the direction of the variation and the amount of the variation of said substantially the same image portion from the standard position to detect the focusing condition of the optical system.

19. An apparatus as in claim 18, wherein said sampling means varies said sampling ranges symmetrically about a standard position at which an optimum correlation is obtained when the optical systemis in an in-focus position.

20. A method for detecting a focusing condition of an image forming optical system which can adjust its focal point relative to an object, said method comprising the steps of:

(A) forming first and second data concerning respective first and second detection images of said object, said first and second detection images being obtained through a pair of portions of said optical system almost symmetrical with respect to the optical axis and having associated image portions relating to said object, said associated image portions varying symmetrically with each other utilizing as a reference the position of said associated image portions when said optical system is in an in-focus position relative to said object, wherein the direction of the variation and amount of the variation indicate the direction of deviation and the amount of deviation from the in-focus position of said optical system, and said first data and second data have associated data portions relating to said associated image portions, and further said associated data portions also varying symmetrically with each other according to the variation of said associated image portions using as a reference the position of said associated data portions when said optical system is in an in-focus position;
(B) forming a pair of data portions by sampling a data portion from respective ones of said first and second data and at the same time varying sampling ranges by sampling said pair of data portions for each one of said first data and second data, then forming said pair of data portions from said first data and second data for every variation in said sampling ranges, while on the other hand, the sampling ranges are varied to correspond to the above-mentioned way of varying the associated data portions, that is, the sampling ranges of said first data and second data are varied [symmetrically and-]concurrently with regard to each one of said first data and said second data; and
(C) detecting the variation of sampling ranges and then detecting the focusing condition of said optical system based on the same.

21. A method as in claim 20, wherein the varying of the sampling ranges of the first data and the second data occurs symmetrically using as a reference and sampling ranges at which a pair of data portions can be obtained that secure an optimum correlation therebetween when the optical system is in an in-focus condition.

22. An automatic focus detection device for a single lens reflex camera which can have various taking lenses with adjustable focus points mounted thereon, comprising:
(A) control means;
(B) light receiving means controlled by said control means for forming first and second data concerning respective first and second detection images of an object, said first and second detection images being obtained through a pair of portions of a mounted taking lens almost symmetrical with respect to the optical axis and having associated image portions varying symmetrically with each other according to the focusing condition of the mounted taking lens, using as the reference the position of said associated image portions at a time when said mounted taking lens is in an in-focus position relative to the object, wherein the direction of said variation and the amount of the variation indicates the direction of deviation and amount of deviation of said mounted taking lens from the in-focus position, and the first data and the second data have associated data portions relating to said associated image portions, while said associated data portions also vary with each other according to the variation of the associated image portions using as the reference the position of said associated data portions when the mounted taking lens is in the in-focus condition, and the varying position of said associated data portions forms a position at which data portions that secure the optimum correlation between the first data and the second data is located;
(C) sampling means controlled by said control means for forming a pair of data portions by sampling data portions from each one of the first data and the second data being produced by the light receiving means and at the same time varying sampling ranges from sampling said pair of data portions for each one of the first data and the second data then forming said pair of data portions from the first data and the second data for every variation of said sampling ranges, said sampling means varying the sampling ranges in a manner corresponding to the manner of varying of the associated data portions, that is, varying the sampling ranges of the first data and the second data concurrently with regard to each one of said first data and second data; and
(D) means for detecting the focusing condition being controlled by said control means by detecting the variation of the sampling ranges.

23. An apparatus as in claim 22, wherein said sampling means varies said sampling ranges symmetrically about a standard position at which an optimum correlation is obtained when the optical system is in an in-focus position.

24. A focus detecting apparatus for an optical system, comprising:
sensing means responsive to the optical system for optically forming a plurality of first partial images and second partial images of an object, and for producing first signals representing respective first partial images and producing second signals representing respective second partial images;
sampling means for successively sampling and correlating pluralities of the first signals and pluralities of the second signals; and
control means for causing the sampling means to change which of the first signals are sampled, to change which of the second signals are sampled, and to make the change of which of said second signals are sampled occur simultaneously with the change in the sampling of the first signals;
said sensing means being arranged relative to the optical system to cause each of the first signals to have the same predetermined relationship to a respective one of the second signals for every in-focus condition of the optical system; and
said control means being arranged to change the sampling of said sampling means when said optical means does not focus on the object until the sampled ones of the first signals have the predetermined relation with the sampled ones of the second signals, and to indicate the amount of change as a measure of the departure of the optical system from an in-focus position on the object.

25. An apparatus as in claim 24, wherein said control means is arranged to cause the sampling means to change which of the signals is sampled until the changes produce a predetermined result with the sampled signals.

26. An apparatus as in claim 24, wherein said control means includes detecting means for determining the number of changes in the signals sampled so as to measure the focus condition.

27. An apparatus as in claim 25 wherein said control means includes detecting means for determining the number of changes in the signals sampled so as to measure the focus condition.

28. An apparatus as in claim 24, wherein:
said control means causes the sampling means to change which of the first signals are sampled and which of the second signals are sampled so that the sampled first and second signals represent first and second portions substantially symmetrical relative to the images.

29. An apparatus as in claim 27, wherein:

said control means causes the sampling means to change which of the first signals are sampled and which of the second signals are sampled so that the sampled first and second signals represent first and second portions substantially symmetrical about relative to the images.

30. An apparatus as in claim 27, wherein:
said control means causes the sampling means to change which of the first signals are sampled and which of the second signals are sampled so that the sampled first and second signals represent first and second portions substantially symmetrical relative to the images.

31. An apparatus as in claim 24, wherein:
said detecting means is arranged to form the images in spatial sequence so that the first portions are in spatial sequence with respect to each other and the second portions are in spatial sequence with respect to each other; and
said sampling means are arranged for sampling each plurality of signals so that the signals in one plurality represent first portions in spatial sequence and in the other represent second portions in spatial sequence.

32. An apparatus as in claim 25, wherein:
said detecting means is arranged to form the images in spatial sequence so that the first portions are in spatial sequence with respect to each other and the second portions are in spatial sequence with respect to each other; and
said sampling means are arranged for sampling each plurality of signals so that the signals in one plurality represent first portions in spatial sequence and in the other represent second portions in spatial sequence.

33. An apparatus as in claim 26, wherein:
said detecting means is arranged to form the images in spatial sequence so that the first portions are in spatial sequence with respect to each other and the second portions are in spatial sequence with respect to each other; and
said sampling means are arranged for sampling each plurality of signals so that the signals in one plurality represent first portions in spatial sequence and in the other represent second portions in spatial sequence.

34. An apparatus as in claim 27, wherein:
said detecting means is arranged to form the images in spatial sequence so that the first portions are in spatial sequence with respect to each other and the second portions are in spatial sequence with respect to each other; and
said sampling means are arranged for sampling each plurality of signals so that the signals in one plurality represent first portions in spatial sequence and in the other represent second portions in spatial sequence.

35. An apparatus as in claim 28, wherein:
said detecting means is arranged to form the images in spatial sequence so that the first portions are in spatial sequence with respect to each other and the second portions are in spatial sequence with respect to each other; and
said sampling means are arranged for sampling each plurality of signals so that the signals in one plurality represent first portions in spatial sequence and in the other represent second portions in spatial sequence.

36. An apparatus as in claim 24, wherein the predetermined relationship is an extreme correlation.

37. An apparatus as in claim 26, wherein the predetermined relationship is a maximum correlation.

38. An apparatus as in claim 24, wherein said sensing means is arranged relative to the optical system so that each of the first partial images is substantially the same as the respective one of the second partial images.

39. A method for detecting a focusing condition of an image forming optical system which can adjust its focal point relative to an object, said method comprising the steps of:
(A) forming first and second data concerning first and second detecting images of said object respectively, said first and second detection images being obtained through a pair of portions of said optical system almost symmetrical with respect to the optical axis and having substantially the same image portions relative to the object, said substantially same image portions varying symmetrically with each other according to the focusing condition of said optical system from the position of said substantially same image portions at a time when said optical system is in an in-focus position relative to the object with the direction of the variation and amount of the variation indicating the direction of deviation and the amount of deviation of said optical system from the in-focus position, and the varying position of said substantially same image portions is a position at which an optimum correlation is obtained;
(B) forming pair of data portions by sampling respective data portions from the first data and the second data and varying sampling ranges with regard to each of one of the first data and the second data, thereby forming said pair of data portions from the first data and the second data for every variation of said sampling ranges, said sampling means varying said sampling ranges symmetrically and concurrently about a standard reference position at which an optimum correlation is obtained when the optical system is in an in-focus position;
(C) operating amounts varying depending on the degree of similarity of each pair of data portions mentioned above as being formed; and
(D) detecting a position at which said optimum correlation is obtained on the basis of the result of the operation means, thereby determining the direction of the variation and the amount of the variation of substantially the same image portion from the standard position to detect the focusing condition of the optical system.

40. A method as in claim 39, wherein the varying of the sampling ranges of the first data and the second data occurs symmetrically using as a reference the sampling ranges at which a pair of data portions can be obtained that secure an optimum correlation therebetween when the optical system is in an in-focus condition.

41. A method for detecting a focusing condition of an image forming optical system movable from an unfocused condition to a condition focused on an object, said method comprising the steps of:
forming first and second data concerning first and second images of the object, said first data being composed of a plurality of first data portions, said second data being composed of a plurality of second data portions and arranged so that the first and second data portions assume a varied state relative to each other when the optical system is in an unfocused condition, the first data portion and the second data portions being otherwise variable relative to each other, the first data portions having corresponding second data portions in each varied state of the first and second data portions;

forming a first sampling range composed of a plurality of first data portions and a second sampling range composed of a plurality of second data portions and for simultaneously varying the first and second sampling ranges relative to each other with regard to one of said first data and second data by changing the plurality of first and second data portions, and successively correlating a plurality of first data portions with a plurality of second data portions to determine the position of an optimum correlation, and detecting deviation of the position of the optimum correlation from the position which is obtained a correlation representing the focused condition of the optical system.

42. A method as in claim 41, wherein the varying of the sampling ranges of the first data and the second data occurs symmetrically using as a reference the sampling ranges at which a pair of data portions can be obtained that secure an optimum correlation therebetween when the optical system is in an in-focus condition.

43. An automatic focus detection device for a single lens reflex camera which can have various taking lenses with adjustable focus points mounted thereon, comprising:

(A) control means;

(B) light receiving means controlled by said control means for forming first and second data concerning first and second detecting images of an object respectively, said first and second detection images being obtained through a pair of portions of a mounted taking lens almost symmetrical with respect to the optical axis and having substantially the same image portions relative to the object, said substantially same image portions varying symmetrically with each other according to the focusing condition of the mounted taking lens from the position of said substantially same image portions at a time when said mounted taking lens is in an in-focus position relative to the object with the direction of the variation and amount of the variation indicating the direction of deviation and the amount of deviation of said mounted taking lens from the in-focus position, and the varying position of said substantially same image portions is a position at which an optimum correlation is obtained;

(C) sampling means controlled by said control means for forming a pair of data portions by sampling respective data portions from the first data and the second data being produced by said light receiving means and varying sampling ranges with regard to each one of the first data and the second data, thereby forming said pair of data portions from the first data and the second data for every variation of said sampling ranges, said sampling means varying said sampling ranges concurrently with regard to each one of said first data and second data;

(D) operation means controlled by said control means for operating amounts varying depending on the degree of similarity of each pair of data portions mentioned above as being formed by the sampling means; and (E) detection means for detecting a position at which said optimum correlation is obtained on the basis of the outputs of the operation means, said detection means determining the direction of the variation and the amount of the variation of said substantially same image portion from the standard position to detect the focusing condition of the mounted taking lens.

44. An apparatus as in claim 43, wherein said sampling means varies said sampling ranges symmetrically about a standard position at which an optimum correlation is obtained when the optical system is in an in-focus position.

45. A method for detecting a focusing condition of an image forming optical system which can adjust its focal point relative to an object, said method comprising the steps of:

(A) forming first and second data concerning first and second detection images of said object respectively, said first and second detection images being obtained through a pair of portions of said optical system almost symmetrical with respect to the optical axis and having substantially the same image portions relative to the object, said substantially the same image portions varying symmetrically with each other according to the focusing condition of said optical system from a standard reference position which is the position of said substantially same image portions at a time when said optical system is in a in-focus positive relative to the object, with the direction of the variation and amount of the variation indicating the direction of deviation and the amount of deviation of said optical system from the in-focus position;

(B) forming pair of data portions by sampling respective data portions from the first data and the second data and varying sampling ranges with regard to each of one of the first data and the second data, thereby forming said pair of data portions from the first data and the second data for every variation of said sampling ranges, said sampling means varying said sampling ranges concurrently with regard to each one of said first data and second data;

(C) operating amounts varying depending on the degree of similarity of each pair of data oortions mentioned above as formed; and (D) determining the direction of the variation and the amount of the variation of said substantially same image portion from the standard position to detect the focusing condition of the optical system.

46. A method as in claim 45, wherein the varying of the sampling ranges of the first data and the second data occurs symmetrically using as a reference the sampling ranges at which a pair of data portions can be obtained that secure an optimum correlation therebetween when the optical system is in an in-focus condition.

47. A automatic focus detection device for a single lens reflex camera which can have various taking lenses with adjustable focus points mounted thereon, comprising:

(A) control means;

(B) light receiving means controlled by said control means for forming first and second data concerning first and second detecting images of an object respectively, said first and second detection images being obtained through a pair of portions of a mounted taking lens almost symmetrical with respect to the optical axis and having substantially the same image portions relative to the object, said substantially same image portions varying symmetrically with each other according to the focusing condition of the mounted taking lens from a standard reference position, which is the position of said substantilly same image portions at a time when said mounted taking lens is in an in-focus position relative to the object, with the direction of the variation and amount of the variation indicating the direction of deviation and the amount of deviation of said mounted taking lens from the in-focus position;

(C) sampling means controlled by said control means for forming a pair of data portions by sampling respective data portions from the first data and the second data being produced by said light receiving means and varying sampling ranges with regard to each of one of the first data and the second data, thereby forming said pair of data portions from the first data and the second data for every variation of said sampling ranges, said sampling means varying said sampling ranges concurrently with regard to each one of said first data and second data;

(D) operation means controlled by said control means for operating amounts varying depending on the degree of similarity of each pair of data portions mentioned above being formed by the sampling means; and (E) detection means for determining the direction of the variation and the amount of the variation of said substantially same image portion from the standard position to detect the focusing condition of the mounted taking lens.

48. An apparatus as in claims 11, 12, 13, 15, 17, 43, or 47, wherein said sampling means varies said sampling ranges symmetrically about a standard position at which an optimum correlation is obtained when the optical system is in an in-focus position.

49. An apparatus as in claim 48, wherein said sampling means varies said sampling ranges symmetrically about a standard position at which an optimum correlation is obtained when the optical system is in an in-focus position.

50. A method for detecting a focusing condition of an image forming optical system which can adjust its focal point relative to an object, comprising the steps of:

(A) forming first and second data concerning respective first and second detection images of said object, said first and second detection images being obtained through a pair of portions of the optical system almost symmetrical with respect to the optical axis and having associated image portions relative to the object, said associated image portions varying symmetrically with each other according to the focusing condition of said optical system using as the reference the position of said associated image portions at a time when said optical system is in an in-focus position relative to the object with the direction of variation and amount of variation indicating the direction of deviation and the amount of deviation of said optical system from the in-focus position, said first data and second data having associated date portions relative to said associated image portions, wherein said associated data portions also vary symmetrically with each other according to the variation of said associated image portions using as the reference the position of said associated data portions when said optical system is in an in-focus position, and the varying positions of said associated data portions form the positions at which said data portions have an optimum correlation between the first data and the second data;

(B) forming a pair of data portions by sampling respective data portions from the first data and the second data and at the same time varying sampling ranges in sampling said pair of data portions with regard to each of one of the first data and the second data, then forming said pair of data portions from the first data and the second data for every variation of said sampling ranges, said varying of said sampling ranges being in a manner corresponding to the manner of varying of said associated data portions, that is, varying the sampling ranges of the first data and the second data concurrently with regard to each one of said first data and second data;

(C) seeking a correlation between the data portions in each pair of data portions being formed; and (D) detecting the focusing condition being controlled by said control means for detecting the variation of the above-mentioned sampling ranges which can obtain the pair of data portions having the optimum correlation of the correlations obtained by said correlation detecting means from said sampling ranges constituting the reference, thus detecting the focusing condition of the optical system based on the same.

51. A method as in claim 21, 39, 41, 45, or 50, wherein the varying of the sampling ranges of the first data and the second data occurs symmetrically using as a reference the sampling ranges at which a pair of data portions can be obtained that secure an optimum correlation therebetween then the optical system is in an in-focus condition.

52. A method as in claim 51, wherein the varying of the sampling ranges of the first data and the second data occurs summetrically using as a reference the sampling ranges at which a pair of data portions can be obtained that secure an optimum correlation therebetween when the optical system is in an in-focus condition.

* * * * *